(12) United States Patent
Kim et al.

(10) Patent No.: US 9,491,774 B2
(45) Date of Patent: Nov. 8, 2016

(54) METHOD AND DEVICE FOR PROVIDING CONTENT CASTING SERVICES

(71) Applicant: Samsung Electronics Co. Ltd., Suwon-si, Gyeonggi-do (KR)

(72) Inventors: Youngri Kim, Suwon-si (KR); Seongil Hahm, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 13/872,696

(22) Filed: Apr. 29, 2013

(65) Prior Publication Data

US 2013/0294358 A1 Nov. 7, 2013

(30) Foreign Application Priority Data

May 3, 2012 (KR) .................. 10-2012-0047040

(51) Int. Cl.
*H04W 4/00* (2009.01)
*H04W 72/12* (2009.01)
*H04W 4/08* (2009.01)
*H04W 4/20* (2009.01)

(52) U.S. Cl.
CPC .............. *H04W 72/12* (2013.01); *H04W 4/08* (2013.01); *H04W 4/206* (2013.01)

(58) Field of Classification Search
USPC ....... 370/312, 315, 328–329, 338, 343, 344, 370/349, 390, 492, 501; 455/11.1, 550.1, 455/552.1, 553.1, 561
See application file for complete search history.

(56) References Cited

U.S. PATENT DOCUMENTS

| | | | | |
|---|---|---|---|---|
| 8,224,302 | B2* | 7/2012 | Moride | 455/414.3 |
| 8,566,469 | B2* | 10/2013 | Jutzi | H04L 29/06027 709/203 |
| 2006/0203758 | A1* | 9/2006 | Tee et al. | 370/315 |
| 2011/0163939 | A1* | 7/2011 | Tam et al. | 345/2.3 |
| 2011/0283334 | A1* | 11/2011 | Choi et al. | 725/148 |

* cited by examiner

*Primary Examiner* — Frank Duong
(74) *Attorney, Agent, or Firm* — Jefferson IP Law, LLP

(57) ABSTRACT

A method and device for content casting services using Wi-Fi communication are disclosed are provided. The device includes a first band communication module for communicating with external devices over a first frequency band and a second band communication module for communicating with external devices over a second frequency band. The method includes detecting occurrence of a cast request event indicating content delivery, selecting, upon detection of the cast request event, a first external device possessing the indicated content, receiving the content from the selected first external device through the first band communication module, and transmitting the received content to a second external device through the second band communication module.

24 Claims, 20 Drawing Sheets

FIG. 10
Main Owner
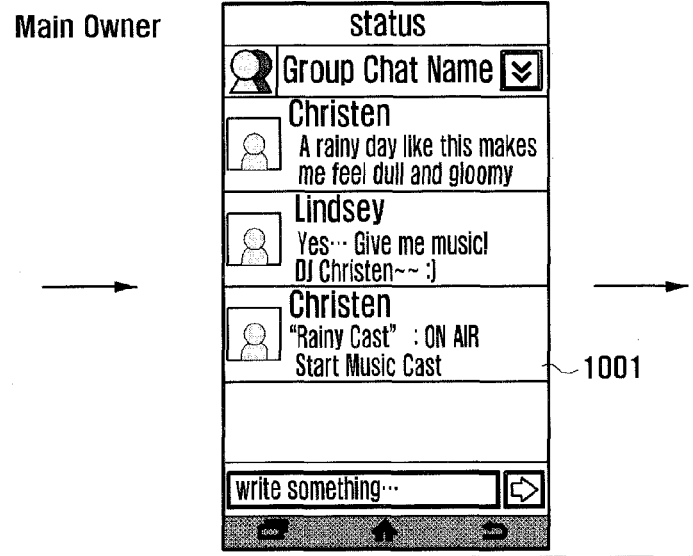
Casting Group 1
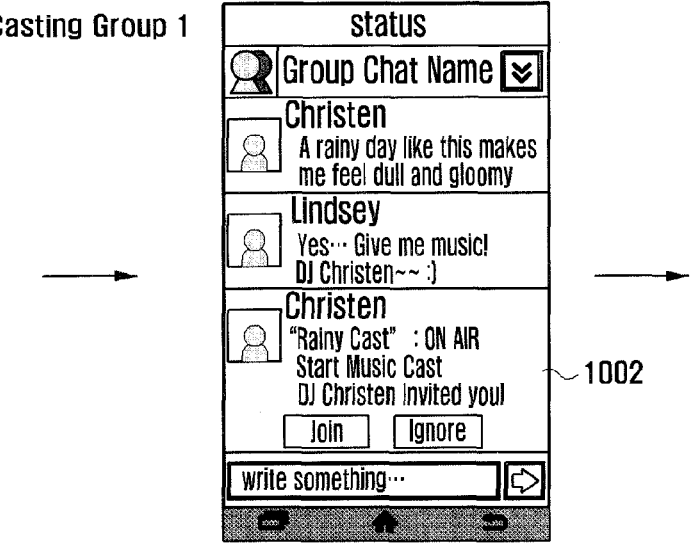
Casting Group 2
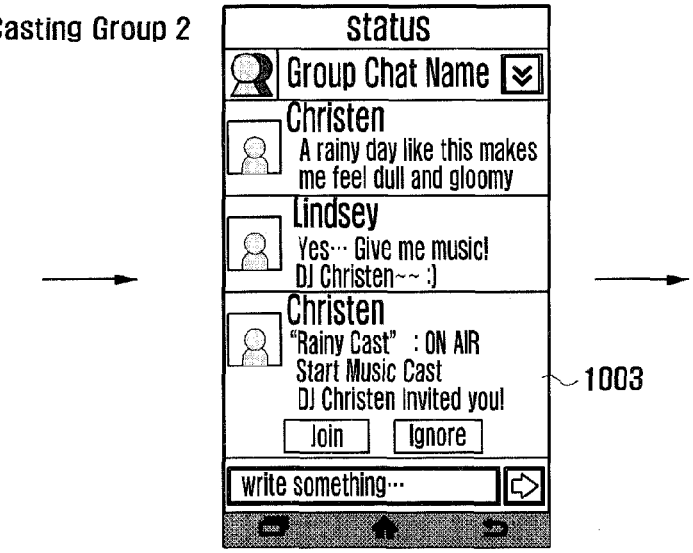

FIG. 14
Main Owner
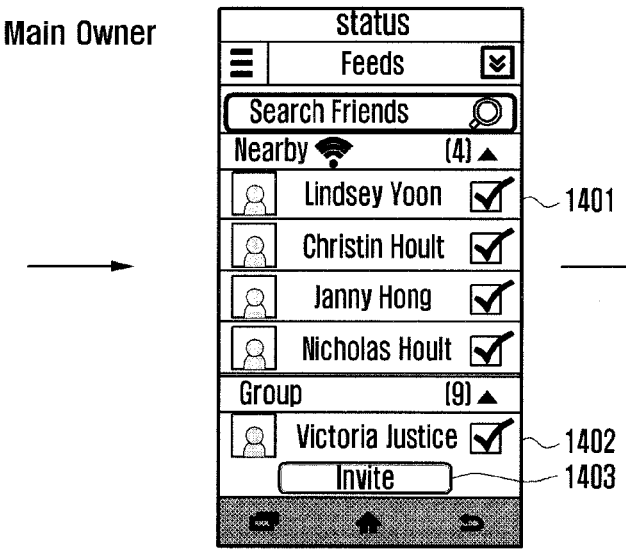
Casting Group 1
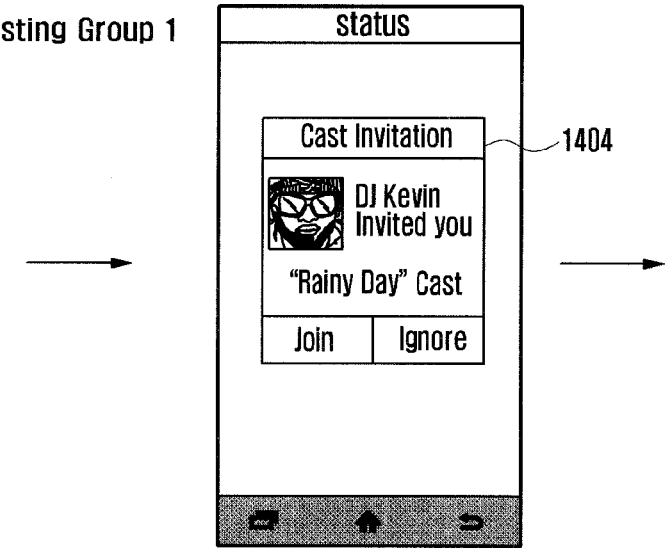
Casting Group 2
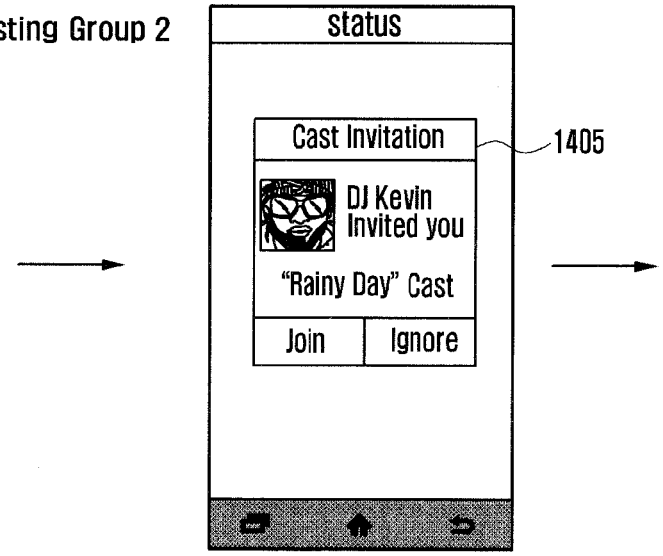

FIG. 16
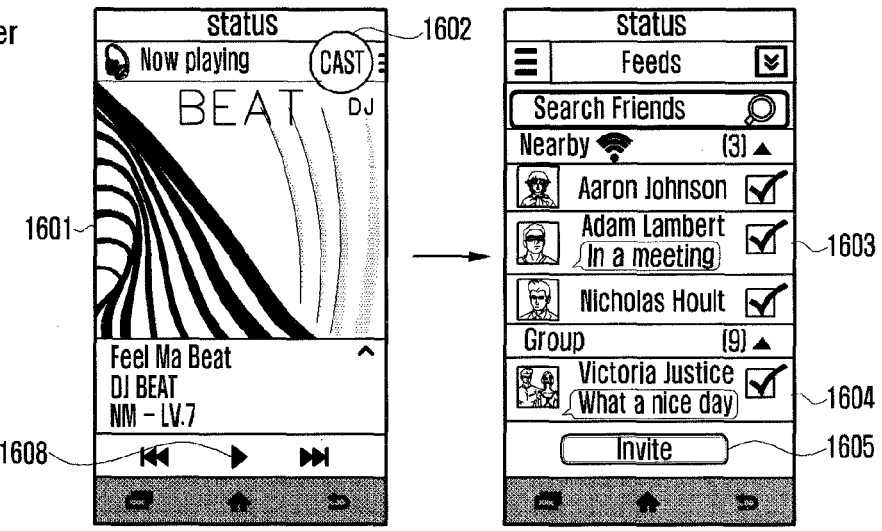
Main Owner
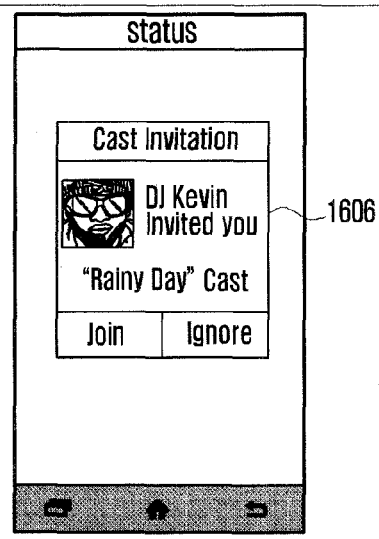
Casting Group 1
Casting Group 2

FIG. 19
Main Owner 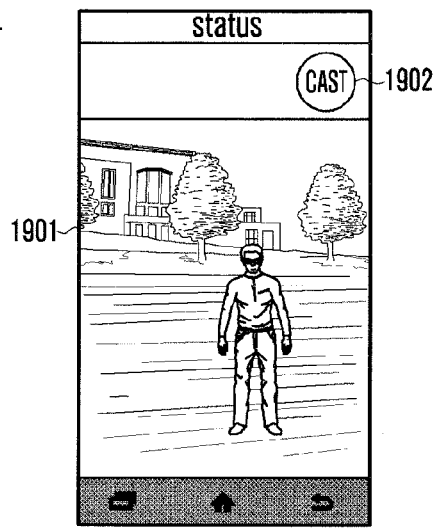 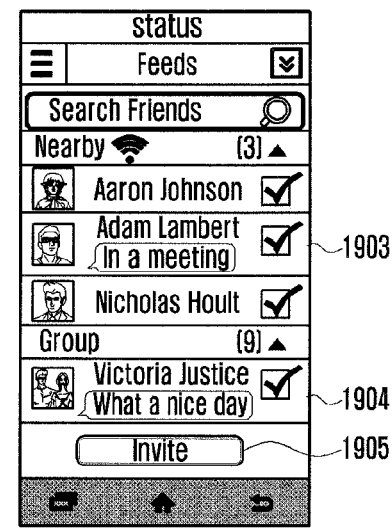
Casting Group 1 
Casting Group 2 

METHOD AND DEVICE FOR PROVIDING CONTENT CASTING SERVICES

PRIORITY

This application claims the benefit under 35 U.S.C. §119(a) of a Korean patent application filed on May 3, 2012 in the Korean Intellectual Property Office and assigned Serial No. 10-2012-0047040, the entire disclosure of which is hereby incorporated by reference.

BACKGROUND OF THE INVENTION

1. Field of the Invention

The present invention relates to a method and device for a Wi-Fi communication system. More specifically, the present invention relates to a method and device that provide content casting services using a Wi-Fi communication system.

2. Description of the Related Art

With recent popularization of terminals or devices supporting Wi-Fi communication or Wireless Local Area Network (WLAN) communication, research has been actively conducted into devices that can provide various services using a WLAN communication system.

In particular, a device may provide a content casting service to another device. For example, a first device may transmit stored content data to a second device such as a Wireless Access Point (WAP) through a first frequency band, and transmit content data to a third device such as a smartphone through a second frequency band. Here, as is widely known, a WAP refers to a device that allows wireless devices to connect to a wired network using Wi-Fi or related standards.

However, an existing device may use only one of a plurality of frequency bands at a particular time to communicate with external devices. In other words, to simultaneously connect to multiple external devices (for example, first and second external devices), an existing device needs to conduct periodic switching between communication channels (actually used frequency bands) at the PHYsical (PHY) layer. For example, the device may receive content data from a first external device (e.g. WAP) through a channel of a first frequency band (e.g. 2.4 GHz) and store the same. The device then switches the PHY layer channel from the first frequency band to a second frequency band (e.g. 5 GHz) and transmits the stored content data to a second external device (e.g. TV) through the second frequency band channel. Then, to connect back to the first external device, the device needs to switch the PHY layer channel from the second frequency band to the first frequency band.

An existing device operating as described above may suffer degradation of maximum available throughput at each frequency band according to loss of throughput due to time division and loss of time due to switching between frequency bands. For example, when the device attempts to transmit a large amount of content data through a 5-GHz band while using Voice over Internet Protocol (VoIP) through a 2.4-GHz band, the amount of content data transmittable through the 5-GHz band may be limited. Additionally, the device may experience loss of time owing to periodic switching between frequency bands at the MAC and PHY layers.

Accordingly, there is a need for a device and method for receiving content data from a first external device through a receive frequency band and simultaneously transmitting the received content data to a second external device through a transmit frequency band.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and device for providing content casting services.

Another aspect of the present invention is to provide a method and device that receives content data from a first external device through a receive frequency band and transmits the received content data to a second external device through a transmit frequency band at the same time.

Another aspect of the present invention is to provide a method and device that transmit content to external devices through multiple transmit frequency bands.

In accordance with an aspect of the present invention, a method of providing a content casting service in a device having a first band communication module for communicating with external devices over a first frequency band and a second band communication module for communicating with external devices over a second frequency band is provided. The method includes detecting occurrence of a cast request event, indicating content delivery, selecting, upon detection of the cast request event, a first external device possessing the indicated content, receiving the content from the selected first external device through the first band communication module, and transmitting the received content to a second external device through the second band communication module.

In accordance with another aspect of the present invention, a method of providing a content casting service in a device having a first band communication module for communicating with external devices over a first frequency band and a second band communication module for communicating with external devices over a second frequency band is provided. The method includes detecting occurrence of a cast request event indicating content delivery, selecting, upon detection of the cast request event, one of content stored in a storage unit, selecting a first external device and a second external device, transmitting the selected content to the first external device through the first band communication module, and transmitting the selected content to the second external device through the second band communication module.

In accordance with another aspect of the present invention, a method of providing a content casting service in a device having a first band communication module for communicating with external devices over a first frequency band and a second band communication module for communicating with external devices over a second frequency band is provided. The method includes detecting occurrence of a cast request event indicating image delivery, receiving, upon detection of the cast request event, captured images from a first external device through the first band communication module, and transmitting the received captured images to a second external device through the second band communication module.

In accordance with another aspect of the present invention, a device capable of providing a content casting service is provided. The device includes a touchscreen capable of providing a user interface for user interactions, a first band communication module capable of communicating with a first external device over a first frequency band, a second band communication module capable of communicating with a second external device over a second frequency band, wherein the first band communication module and the second band communication module are integrated into one chip, and a control unit capable of controlling the touchscreen, the first band communication module and the second band communication module, wherein the control unit is capable of controlling a process of detecting occurrence of a cast request event indicating content delivery, selecting, upon detection of the cast request event, the first external device possessing the indicated content, receiving the content from the first external device through the first band communication module, and transmitting the received content to the second external device through the second band communication module.

In accordance with another aspect of the present invention, a device capable of providing a content casting service is provided. The device includes a touchscreen capable of providing a user interface for user interaction, a first band communication module capable of communicating with a first external device over a first frequency band, a second band communication module capable of communicating with a second external device over a second frequency band, wherein the first band communication module and the second band communication module are integrated into one chip, and a control unit capable of controlling the touchscreen, the first band communication module and the second band communication module, wherein the control unit is capable of controlling a process of detecting occurrence of a cast request event indicating content delivery, selecting, upon detection of the cast request event, one of content stored in a storage unit, selecting a first external device and second external device, transmitting the selected content to the first external device through the first band communication module, and transmitting the selected content to the second external device through the second band communication module.

In accordance with another aspect of the present invention, a device capable of providing a content casting service is provided. The device includes a touchscreen capable of providing a user interface for user interaction, a first band communication module capable of communicating with a first external device over a first frequency band, a second band communication module capable of communicating with a second external device over a second frequency band, wherein the first band communication module and the second band communication module are integrated into one chip, and a control unit capable of controlling the touchscreen, the first band communication module and the second band communication module, wherein the control unit is capable of controlling a process of detecting occurrence of a cast request event indicating image delivery, receiving, upon detection of the cast request event, captured images from the first external device through the first band communication module, and transmitting the received captured images to the second external device through the second band communication module.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 9 to 11 are screen representations depicting steps in the method of FIG. 8 according to exemplary embodiments of the present invention;

FIGS. 13 and 14 are screen representations depicting steps in the method of FIG. 12 according to exemplary embodiments of the present invention;

FIG. 16 illustrates screen representations depicting steps in the method of FIG. 15 according to exemplary embodiments of the present invention;

FIG. 19 illustrates screen representations of a method for providing a content casting service according to exemplary embodiments of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the terms "cast" or "casting" may refer to a unicast where a device sends content to one external device, a multicast where a device sends content to multiple external devices belonging to the same group, or a broadcast where a device sends content to multiple unspecified external devices.

The method and device according to exemplary embodiments of the present invention are applicable to terminals with a communication function. That is, the exemplary method and device of the present invention can be applied to communication and multimedia appliances such as a smartphone, a tablet computer, a laptop computer, a desktop computer, a TV, a navigation aid, a videophone, and the like. The exemplary method and device may also be applied to convergence appliances such as a refrigerator having a communication function and a TV.

The description primarily focuses upon the provision of a content casting service using Wireless Local Area Network (WLAN). However, the content casting service may also be provided using a different communication scheme such as Bluetooth. In the following description, only multicasting is described and illustrated. However, it is to be understood that the present invention is also applicable to unicasting or broadcasting.

Figure 1:
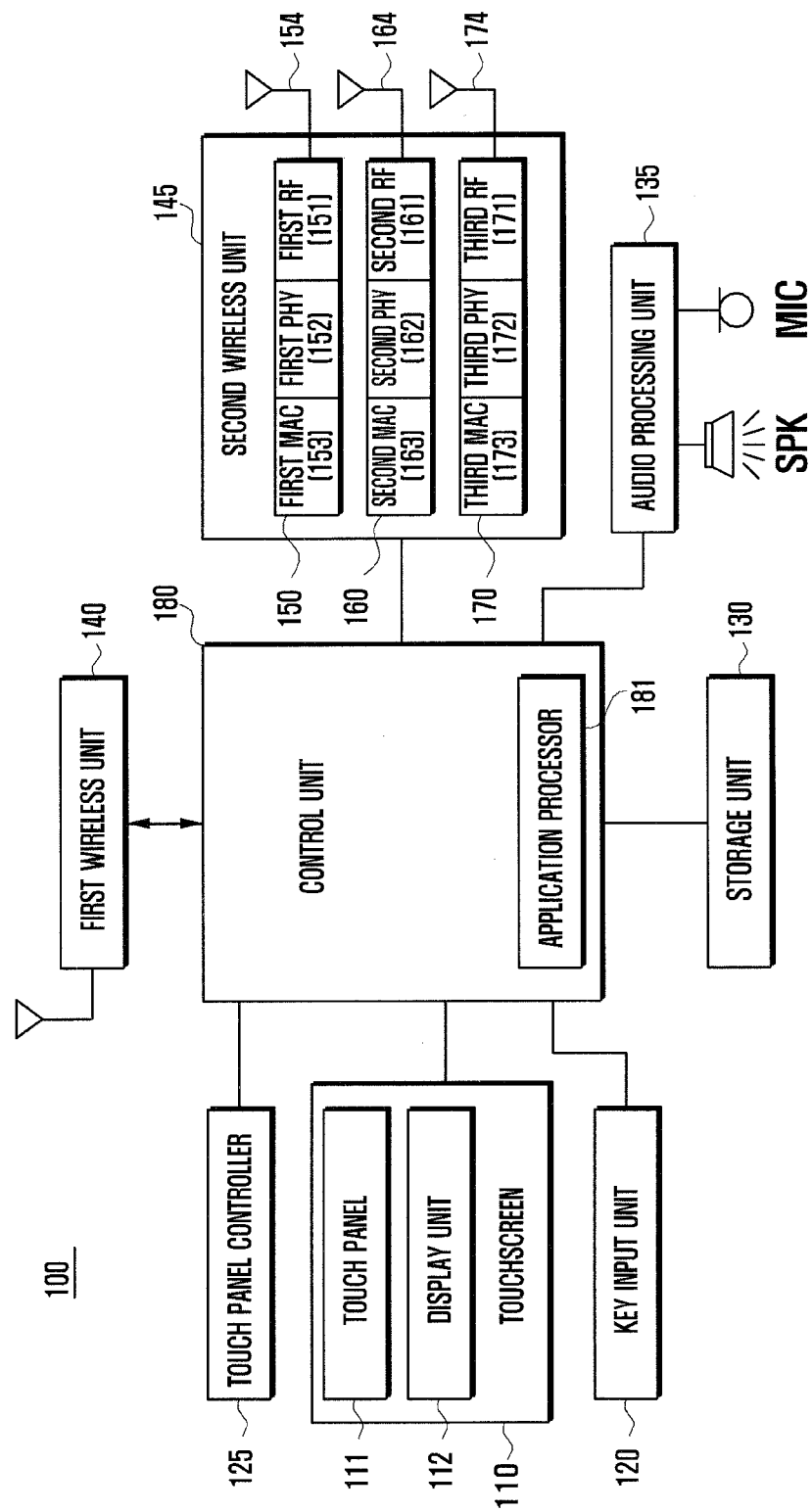
FIG. 1 is a block diagram of a device according to an exemplary embodiment of the present invention.

FIG. 1 is a block diagram of a device according to an exemplary embodiment of the present invention.

Referring to FIG. 1, the device 100 may include a touchscreen 110 including a touch panel 111 and a display unit 112, a key input unit 120, a touch panel controller 125, a storage unit 130, an audio processing unit 135 including a speaker (SPK) and microphone (MIC), a first wireless unit 140, a second wireless unit 145, and a control unit 180.

The touch panel 111 may be placed on the display unit 112. The touch panel 111 generates touch data (e.g. touch event) corresponding to a touch gesture made by the user and sends the touch data to the control unit 180. The touch panel 111 may be of an add-on type (e.g., placed on the display unit 112) or an on-cell or in-cell type (e.g., inserted in the display unit 112). The control unit 180 may control other components on the basis of touch data sent by the touch panel 111. Touch data or a touch event may be divided into a touch action and touch gesture. A touch action may include a touch, a tap, a double tap, a long tap, a drag, a drag and drop, a flick, a press, and the like. Here, a touch corresponds to single point contact with the screen using a touch means such as a finger or stylus pen; a tap corresponds to touch and release at the same point; a double tap corresponds to two consecutive taps at the same point; a long tap corresponds to a long touch and a release at the same point; a drag corresponds to a touch and a move in one direction; a drag and drop corresponds to a drag and a release; a flick corresponds to a touch, a fast move and a release; and a press corresponds to a touch and a push at the same point. Namely, a touch action may be focused on a state of contact on the screen, and a touch gesture may be focused on a movement of a touch action from a contact on the screen to a release from the screen. The touch panel 111 may include a pressure sensor to sense pressure at a touched point. In that case, sensed pressure information is sent to the control unit 180, which can distinguish a touch from a press on the basis of the sensed pressure information. The touch panel 111 may be realized using a resistive, a capacitive, or an electromagnetic induction technology.

The display unit 112 converts video data from the control unit 180 into an analog signal and displays the analog signal under control of the control unit 180. The display unit 112 may output various screens generated in the course of using the device 100, such as a lock screen, a home screen, an application (or app) screen, a menu screen, a keypad screen, a message-handling screen, and an Internet access screen. The lock screen is displayed when the display unit 112 is turned on. When a given touch event for unlocking is generated, the control unit 180 may perform a screen transition from the lock screen to the home screen or a preset app screen. The home screen includes a plurality of icons mapped to various apps. When one of the icons is selected by the user, the control unit 180 may execute an app mapped with the selected icon and control the display unit 112 to display the corresponding application screen. The display unit 112 may be realized using a flat display panel composed of Liquid Crystal Display (LCD) devices, Organic Light Emitting Diodes (OLEDs), or Active Matrix Organic Light Emitting Diodes (AMOLEDs).

The key input unit 120 may include a plurality of alphanumeric and function keys for entering alphanumeric information and for setting various functions. The function keys may include direction, side, and shortcut keys associated with corresponding functions. The key input unit 120 transmits key signals from the user for setting and controlling the device 100 to the control unit 180. Key signals may be related to power on/off, volume adjustment, and screen on/off. The control unit 180 may control the components according to key signals. The key input unit 120 may include a QWERTY keypad, a 3*4 keypad, or a 4*3 keypad, including multiple keys. When the touch panel 111 is configured to support a full touchscreen feature, the key input unit 120 may include only one or more side keys that are arranged at sides of the case of the device 100 for screen on/off and power on/off.

The touch panel controller 125 is connected to the touch panel 111. The touch panel controller 125 receives analog touch data from the touch panel 111, converts the analog touch data into digital touch data, and sends the digital touch data to the control unit 180. The control unit 180 identifies a touch gesture from the received touch data. That is, the control unit 180 may extract information regarding a touch point, a distance, a direction and speed of the touch and movement, and a touch pressure.

The storage unit 130 may include a high-speed random access memory, nonvolatile memory, optical storage medium, and flash memory (NAND or NOR type). The storage unit 130 stores various kinds of software such as an operating system, a communication program, a graphics program, a user interface program, and other applications. Modules or components of particular software include a set of instructions. The operating system (for example, Windows, Linux, Darwin, RTXC, UNIX, OS X, or VxWorks) includes various software modules for controlling the device 100. The communication program includes instructions enabling the device 100 to communicate with external devices through the first wireless unit 140 and second wireless unit 145. More particularly, the communication program may include a routine for determining whether to activate a content casting service on the basis of detected user input, and a routine for actually providing a content casting service. The graphics program includes various components for displaying graphics data on the touchscreen 110. Here, graphics data may be composed at least one of text, web pages, icons, digital images, video and animation. The graphics program includes a routine for controlling an operation to display graphics data corresponding to a function executed by the control unit 180 on the touchscreen 110. The user interface program includes various routines for managing interactions between the device 100 and the user. Application programs may perform operations related to Web browsing, electronic mail, instant messaging, word processing, keyboard emulation, address books, widgets, Digital Rights Management (DRM), speech recognition, position determination, location based services, content casting services, and the like. The storage unit 130 may further store other programs or routines, or may not store one or more of programs or routines described above.

The audio processing unit 135 inputs and outputs audio signals for speech recognition, voice reproduction, digital recording, and call processing by means of the speaker and microphone. The audio processing unit 135 outputs an audio signal through the speaker and receives an audio signal through the microphone. The audio processing unit 135 converts audio data from the control unit 180 into an electrical signal and outputs the electrical signal to the speaker, and converts an electrical signal from the microphone into audio data and outputs the audio data to the control unit 180. The speaker converts an electrical signal from the audio processing unit 135 into a sound wave for output. The microphone converts a sound wave propagated from a sound source such as a person into an electrical signal.

The first wireless unit 140 and the second wireless unit 145 perform communication operations to send and receive signals (e.g. carrying content data) to and from external devices. The first wireless unit 140 may include at least one of a radio frequency transceiver and an optical (e.g. infrared) transceiver. For example, the first wireless unit 140 may support one of Global System for Mobile Communications (GSM) network, Enhanced Data Rates for GSM Evolution (EDGE) network, Code Division Multiple Access (CDMA) network, Wideband Code Division Multiple Access (WCDMA) network, Long Term Evolution (LTE) network, Orthogonal Frequency Division Multiple Access (OFDMA) network, and Bluetooth network.

The second wireless unit 145 supports Wi-Fi communication. The second wireless unit 145 may include a first band communication module 150 and a second band communication module 160 that are physically separated to send and receive signals using different frequency bands. For example, the first band communication module 150 and second band communication module 160 may respectively support 2.4 GHz and 5 GHz, and may support other frequency bands according to design. The first band communication module 150 and second band communication module 160 may each include an RF section, a PHY layer, and a MAC layer. Hence, the second wireless unit 145 may receive a signal through a first frequency band and send a signal through a second frequency band at the same time. The second wireless unit 145 may simultaneously receive signals or simultaneously send signals through a first frequency band and a second frequency band at the same time. The frequency bands (for example, 2.4 GHz and 5 GHz) supported respectively by the first band communication module 150 and second band communication module 160 may be independent of one another. Thereby, interference between receive and transmit signals can be avoided and RF performance degradation can be prevented.

The first band communication module 150 may include a first RF section 151, a first PHY layer 152, a first MAC layer 153 and a first antenna 154 to process a first frequency band signal. The second band communication module 160 may include a second RF section 161, a second PHY layer 162, a second MAC layer 163 and a second antenna 164 to process a second frequency band signal.

The first band communication module 150 and the second band communication module 160 may be configured as physically separate entities in the same chip. That is, a signal received by the first antenna 154 is delivered through the first RF section 151, first PHY layer 152 and first MAC layer 153 to an application processor 181; and a transmit signal from the application processor 181 is delivered through the first MAC layer 153, first PHY layer 152 and first RF section 151 to the first antenna 154. A signal received by the second antenna 164 is delivered through the second RF section 161, second PHY layer 162 and second MAC layer 163 to the application processor 181; and a transmit signal from the application processor 181 is delivered through the second MAC layer 163, second PHY layer 162 and second RF section 161 to the second antenna 164. Under control of the application processor 181, the first band communication module 150 and the second band communication module 160 may receive signals at the same time; the first band communication module 150 and the second band communication module 160 may transmit signals at the same time; the first band communication module 150 may receive a signal and the second band communication module 160 may transmit a signal at the same time; or the first band communication module 150 may transmit a signal and the second band communication module 160 may receive a signal at the same time.

The first frequency band (for example, 2.4 GHz) supported by the first band communication module 150 and the second frequency band (for example, 5 GHz) supported by the second band communication module 160 may not overlap with each other. Hence, interference between a first frequency band signal and a second frequency band signal can be avoided, preventing RF performance degradation.

The first RF section 151 (the second RF section 161) receives an RF signal from the first antenna 154 (the second antenna 164), converts the RF signal into a baseband signal, and outputs the baseband signal to the first PHY layer 152 (the second PHY layer 162). The first RF section 151 (the second RF section 161) receives a baseband signal from the first PHY layer 152 (the second PHY layer 162), converts the baseband signal into an RF signal, and outputs the RF signal to the first antenna 154 (the second antenna 164). The first RF section 151 and the second RF section 161 may each include an amplifier, mixer, oscillator, DAC, and filter.

The first PHY layer 152 (the second PHY layer 162) may act as a modem for performing conversion between a baseband signal and a bit string according to the physical layer specification of Wi-Fi communication. For example, when Wi-Fi communication employs Orthogonal Frequency Division Multiplexing (OFDM) the first PHY layer 152 (the second PHY layer 162) converts a bit string to be sent into complex symbols through coding and modulation, and converts the complex symbols into OFDM symbols through complex symbol-to-subcarrier mapping, Inverse Fast Fourier Transform (IFFT) and Cyclic Prefix (CP) insertion for data transmission. For data reception, the first PHY layer 152 (the second PHY layer 162) separates a baseband signal into OFDM symbols, and converts the OFDM symbols into a bit string through subcarrier-to-complex symbol mapping, Fast Fourier Transform (FFT), demodulation, and decoding.

The first MAC layer 153 (the second MAC layer 163) may use various communication-related algorithms in relation to network access control (or addressing), channel sharing between multiple nodes (or collision avoidance), packet encryption, fragmentation, power saving mode, and flow control.

In the above description, for signal transmission and reception, the first band communication module 150 and second band communication module 160 are depicted as each having one antenna (i.e. the first antenna 154 or second antenna 164). However, the first band communication module 150 and second band communication module 160 may be designed to share a single antenna by employing a diplexer to separate the path of the first RF section 151 from that of the second RF section 161.

The second wireless unit 145 may further include a third band communication module 170, which acts similarly to the first and second band communication modules 150 and 160 but uses a different frequency band. The third band communication module 170 may include a third RF section 171, a third PHY layer 172, a third MAC layer 173 and a third antenna 174 to process a signal of a second frequency band.

The control unit 180 controls the overall operation of the device 100, controls signal exchange between the internal components thereof, and performs data processing. The control unit 180 also controls power supply from a battery to other components. The control unit 180 executes an application in response to a touch gesture. To achieve this, the control unit 180 may include the application processor 181.

The application processor 181 may determine the receive frequency band and the transmit frequency band when a casting request event (e.g., a touch on a "Cast" button on the screen) is detected. For example, the application processor 181 may determine to use a first frequency band and a second frequency band respectively for reception and transmission, or use the first frequency band and the second frequency band respectively for transmission and reception. The first frequency band and the second frequency band may be in the same frequency range of, for example, 2.4 GHz. In this case, the first frequency band and the second frequency band may correspond to non-overlapping orthogonal channels. For example, the first frequency band and the second frequency band may be assigned in the frequency range of 2.4 GHz. In the 2.4 GHz range, 14 channels may be defined (channel bandwidth of 22 MHz and channel separation of 5 MHz), and three non-overlapping channels (Channels 1, 6 and 11) are possible. Then, the first frequency band may be related to Channel 1 and the second frequency band may be related to Channel 6 or 11. The application processor 181 may determine to use both the first frequency band and the second frequency band for transmission, or use both the first frequency band and the second frequency band for reception.

The application processor 181 may set the receive frequency band and the transmit frequency band to a preset frequency range, or determine the receive frequency band and the transmit frequency band according to a function used in a content casting service and external devices involved in the content casting service. That is, the application processor 181 may determine the receive frequency band and the transmit frequency band in consideration of frequencies used by an executed function or supported by external devices during a content casting service. For example, when a Web browsing function and a display function are used in a content casting service, the application processor 181 may determine the receive frequency band and the transmit frequency band according to frequencies used by the Web browsing function and the display function. Here, the device 100 may execute the Web browsing function to receive Web pages through an external device such as a wireless Access Point (AP), and execute the display function to display content on an external device such as a TV by sending content data (e.g. received Web pages) to the external device. For another example, when the device 100 is already connected with an access point, to initiate a content casting service, the application processor 181 may determine the receive frequency band and the transmit frequency band in consideration of a frequency band used to connect to the access point. Here, the receive frequency band may be set to the frequency band used to connect to the access point, and the transmit frequency band may be set to a different frequency band.

The application processor 181 controls an operation to receive content through the first band communication module 150 and send the received content through the second band communication module 160 at the same time. The application processor 181 may determine to operate in a dual mode or a repeater mode according to characteristics of the current content casting service. In the repeater mode, content received by the first band communication module 150 is forwarded directly to the second band communication module 160 (the application processor 181 is bypassed). In the dual mode, content received by the first band communication module 150 is sent to the application processor 181, which processes the content (for example, resolution adjustment or resizing) and forwards the processed content to the second band communication module 160. The application processor 181 may send content stored in the device 100 to both the first band communication module 150 and second band communication module 160. The application processor 181 may receive content through both the first band communication module 150 and the second band communication module 160 from the outside.

The exemplary device 100 of the present invention may further include an external port, a vibration motor, a Global Positioning Sensor (GPS) receiver, a camera module, and the like (not shown). With the trend towards digital convergence, it should be apparent that the exemplary device 100 of the present invention may further include a unit comparable to the above-described units, and one unit of the device 100 may be removed or replaced with another unit.

Figure 2:
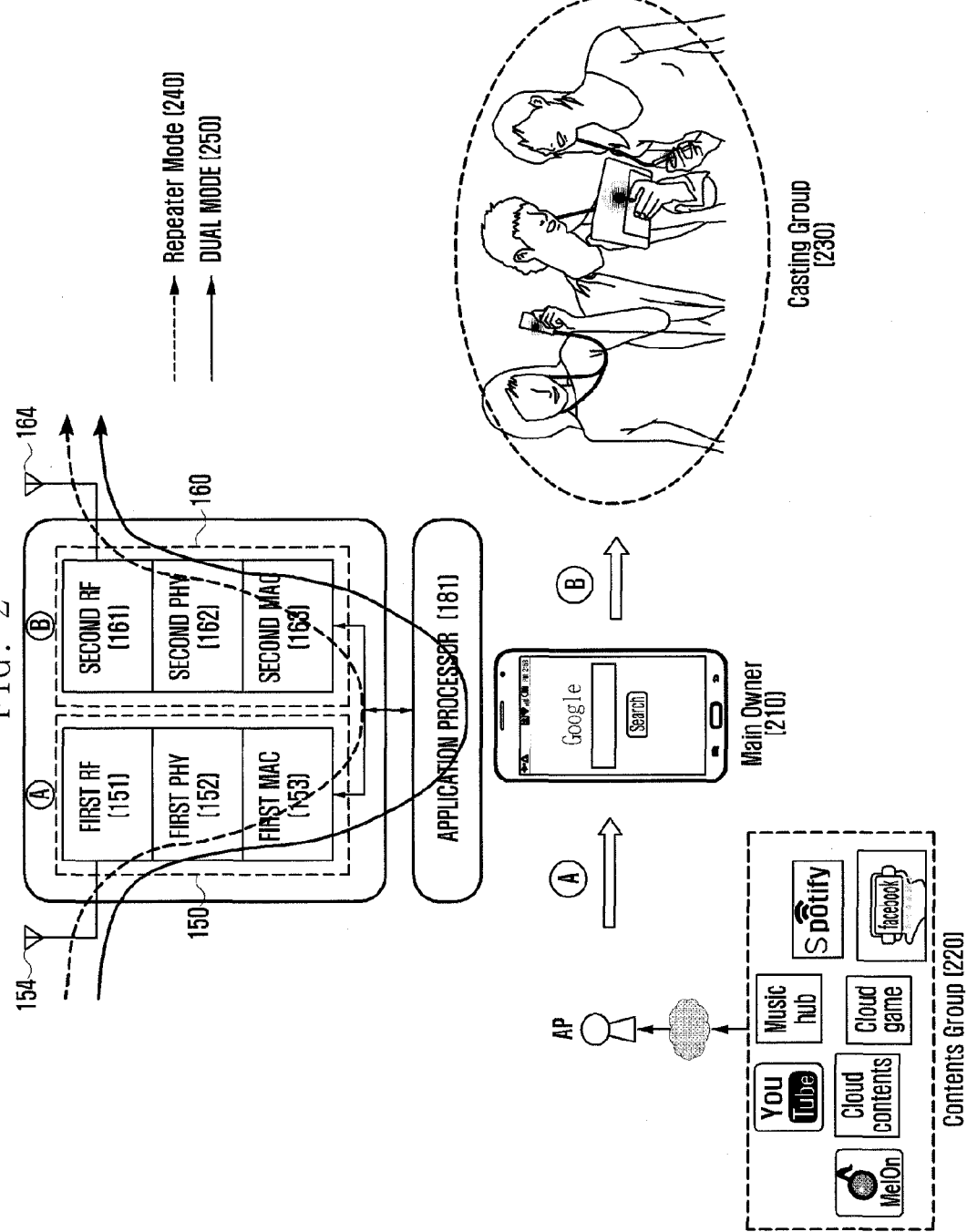
FIG. 2 illustrates a content casting service according to an exemplary embodiment of the present invention.

FIG. 2 illustrates a content casting service according to an exemplary embodiment of the present invention.

In the following description, a "main owner" refers to a device that casts content to other devices. A "contents group" refers to one or more devices that are capable of providing content to the main owner. A "casting group" refers to one or more devices that receive content from the main owner. One or more casting groups may be present according to frequency bands. For example, a casting group communicating with the main owner through a first frequency band may be referred to as a first casting group, and a casting group communicating with the main owner through a second frequency band may be referred to as a second casting group. The contents group may communicate with the main owner through a frequency band not used by the casting group.

Referring to FIG. 2, a main owner 210 may include the above-described components 181, 150 and 160. The main owner 210 may connect to an access point through the first band communication module 150. After being connected to the access point, the main owner 210 may detect a user input for connecting to a contents group 220 (for example, selection of a YouTube icon on the touchscreen). Here, the contents group 220 may include a cloud server, a Social Networking Service (SNS) server such as Twitter or Facebook, a moving image database server such as YouTube, and the like. In response to a user input, the main owner 210 may connect to an external device in the contents group 220 through the access point, receive content from the external device, and play back the received content in real time.

The main owner 210 may connect to a casting group 230 through the second band communication module 160. Here, the second band communication module 160 may directly connect to the casting group 230 without an intermediate medium such as an access point. Direct connection between the main owner 210 and casting group 230 may be achieved using, for example, Wi-Fi Direct. As Wi-Fi Direct is known in the art, a detailed description thereof is omitted herein.

When the user enters an input for a content casting service (for example, touch on the "Cast" button on the touchscreen), the main owner 210 may transmit the content received from the external device of the contents group 220 to the casting group 230.

As described above, the main owner 210 may receive content from the contents group 220 through the access point and transmit the received content to the casting group 230. In FIG. 2, the user may use a smartphone (main owner 210) to view a moving image received from YouTube (contents group 220) and share the moving image with nearby friends (casting group 230). Hence, the user may view and enjoy a moving image together with friends.

The main owner 210 may determine whether to operate in a repeater mode 240 or dual mode 250. For example, when content is a document file or a compressed file, the main owner 210 may determine to operate in the repeater mode 240. On the other hand, when content is a moving image, the main owner 210 may determine to operate in the dual mode 250. In the repeater mode 240, the main owner 210 uses the first band communication module 150 to receive content through the access point and uses the second band communication module 160 to transmit the received content in real time. In the dual mode 250, the main owner 210 uses the first band communication module 150 to receive content through the access point, processes the received content through the application processor 181 (for example, resolution adjustment or resizing) and uses the second band communication module 160 to transmit the processed content in real time. In the dual mode 250, the content delivered to the casting group 230 may be content received through the access point, or be content generated by or stored in the main owner 210 (for example, camera-captured images).

Figure 3:
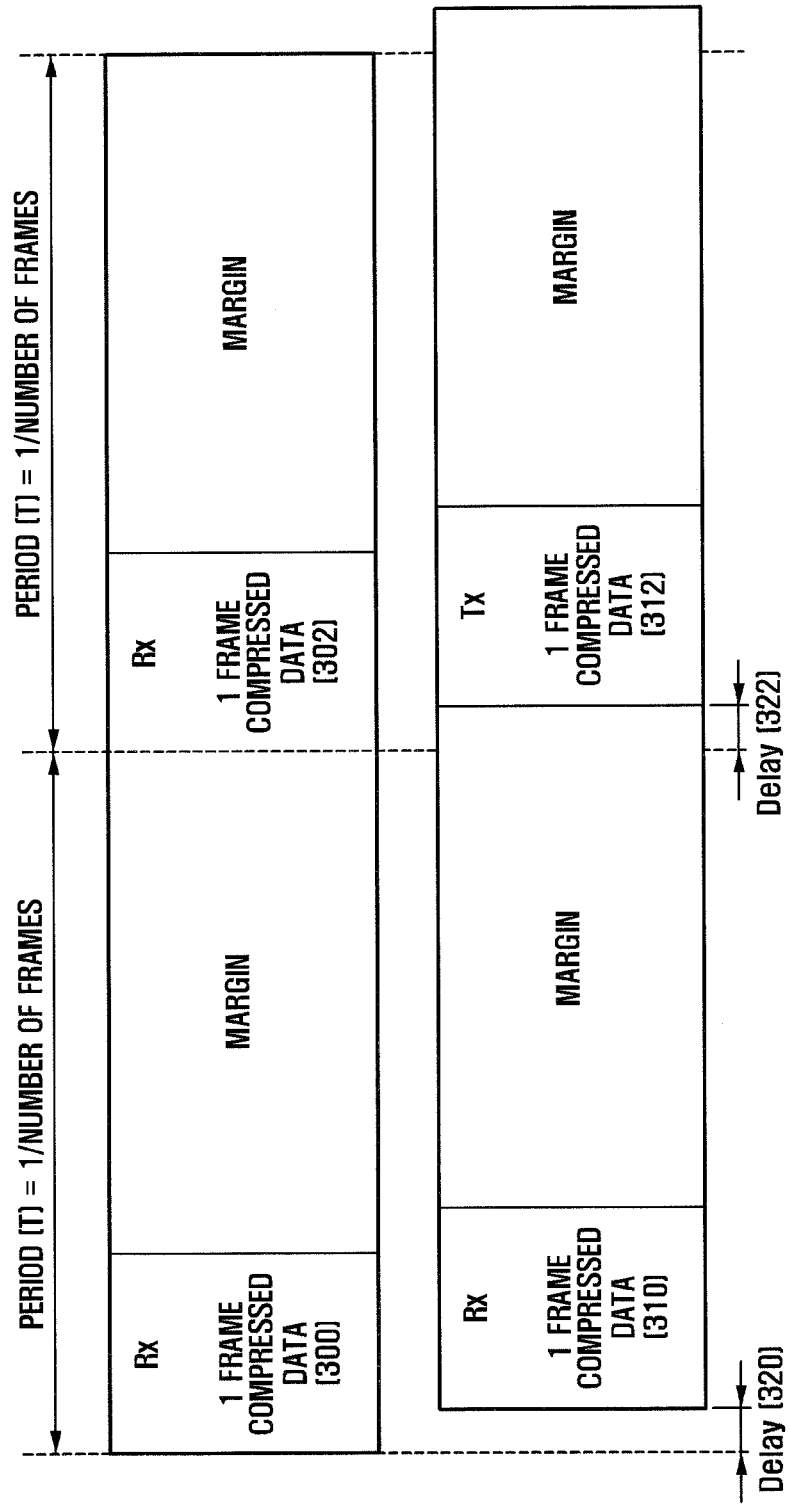
FIGS. 3 and 4 illustrate a time domain relationship between receive and transmit signals during a content casting service of a device according to an exemplary embodiment of the present invention.
Figure 4:
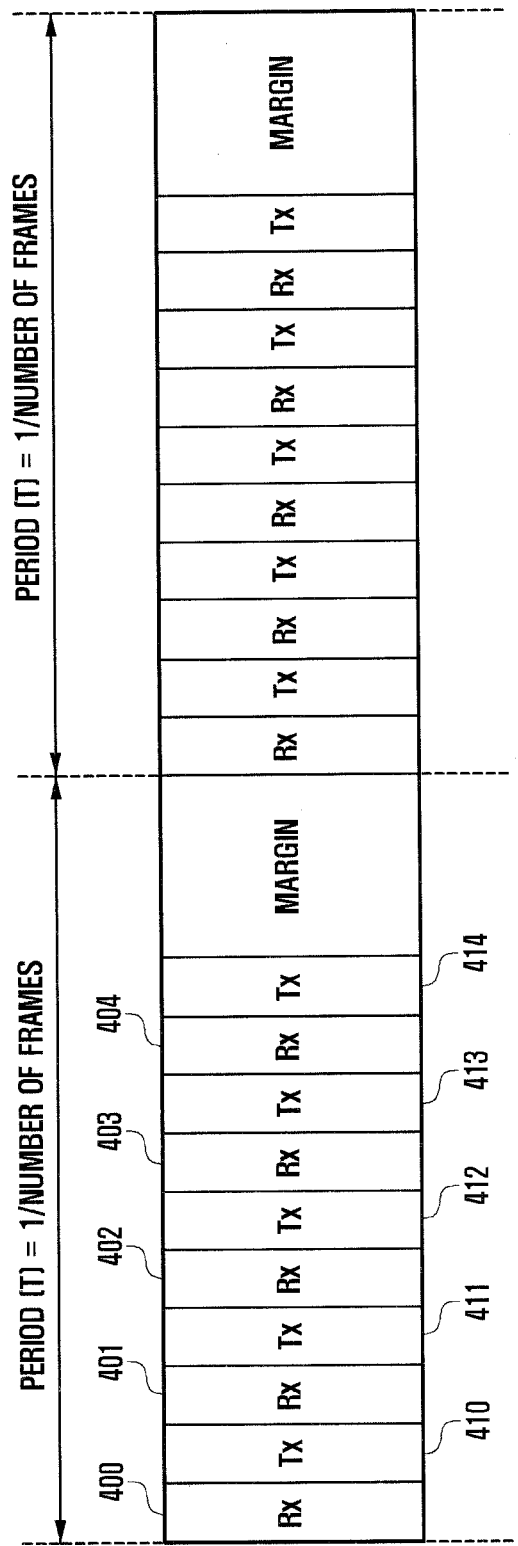

FIGS. 3 and 4 illustrate a time domain relationship between receive and transmit signals during a content casting service of a device according to an exemplary embodiment of the present invention.

Referring to FIGS. 3 and 4, since the main owner 210 includes the two communication modules 150 and 160 that operate independently on different frequency bands within the same chip as described in connection with FIG. 2, the main owner 210 may simultaneously receive content from the contents group 220 and transmit the received content to the casting group 230. Hence, as shown in FIG. 3, the device 100 does not need a separate switching time for receiving content and transmitting the received content, and can simultaneously perform content reception as indicated by reference numeral 300 or 302 and content transmission as indicated by reference numeral 310 or 312. As content reception and content transmission are simultaneously performed (without time delay due to switching between frequency bands), exemplary embodiments of the present invention have an advantage over related art techniques in terms of real-time playback. Delay indicated by reference numeral 320 or 322 in FIG. 3 has no relation to switching between frequency bands, and is merely a time needed for the main owner 210 to transmit content received through the first band communication module 150 from the access point to the casting group 230 through the second band communication module 160.

When a single host interface is used for communication between the application processor 181 and the communication modules 150 and 160, the application processor 181 has to alternately communicate with the first band communication module 150 and the second band communication module 160. In this case, the first band communication module 150 and second band communication module 160 may fragment one transmit or receive frame into multiple packets under control of the application processor 181. The application processor 181 may alternately communicate with the first band communication module 150 and the second band communication module 160 on the basis of fragmented packets. As shown in FIG. 4, the application processor 181 may process receive packets indicated by reference numerals 400, 401, 402, 403 and 404 alternately with transmit packets indicated by reference numerals 410, 411, 412, 413 and 414. As the application processor 181 does not have to switch between frequency bands at the MAC or PHY layer (no time delay due to switching between frequency bands), exemplary embodiments of the present invention are more advantageous to real-time playback in comparison to a related art technique.

Figure 5:
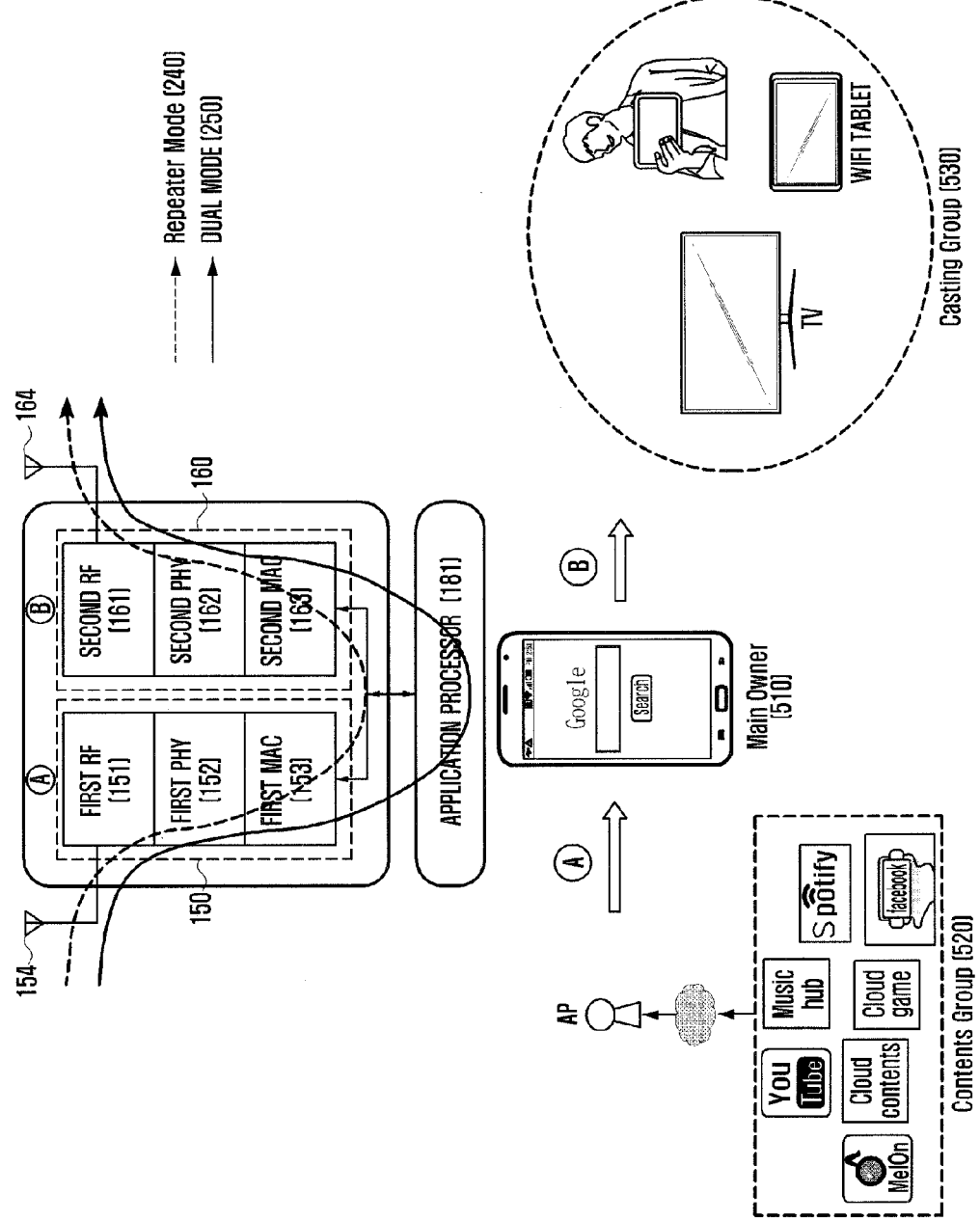
FIG. 5 illustrates a content casting service according to an exemplary embodiment of the present invention.

FIG. 5 illustrates a content casting service according to an exemplary embodiment of the present invention.

Referring to FIG. 5, a main owner 510 may include the above-described components 181, 150 and 160. The main owner 510 may simultaneously receive content from a contents group 520 through the first band communication module 150 and an access point and transmit the received content to a casting group 530. In FIG. 5, the main owner 510 is a home network server. The casting group 530 includes user appliances connected to the home network. Such home network appliances may be connected with the home network server using Wi-Fi Direct techniques. The home network appliances may include a smartphone, a TV, a tablet computer, a laptop computer, a refrigerator having a TV, and the like.

Figure 6:
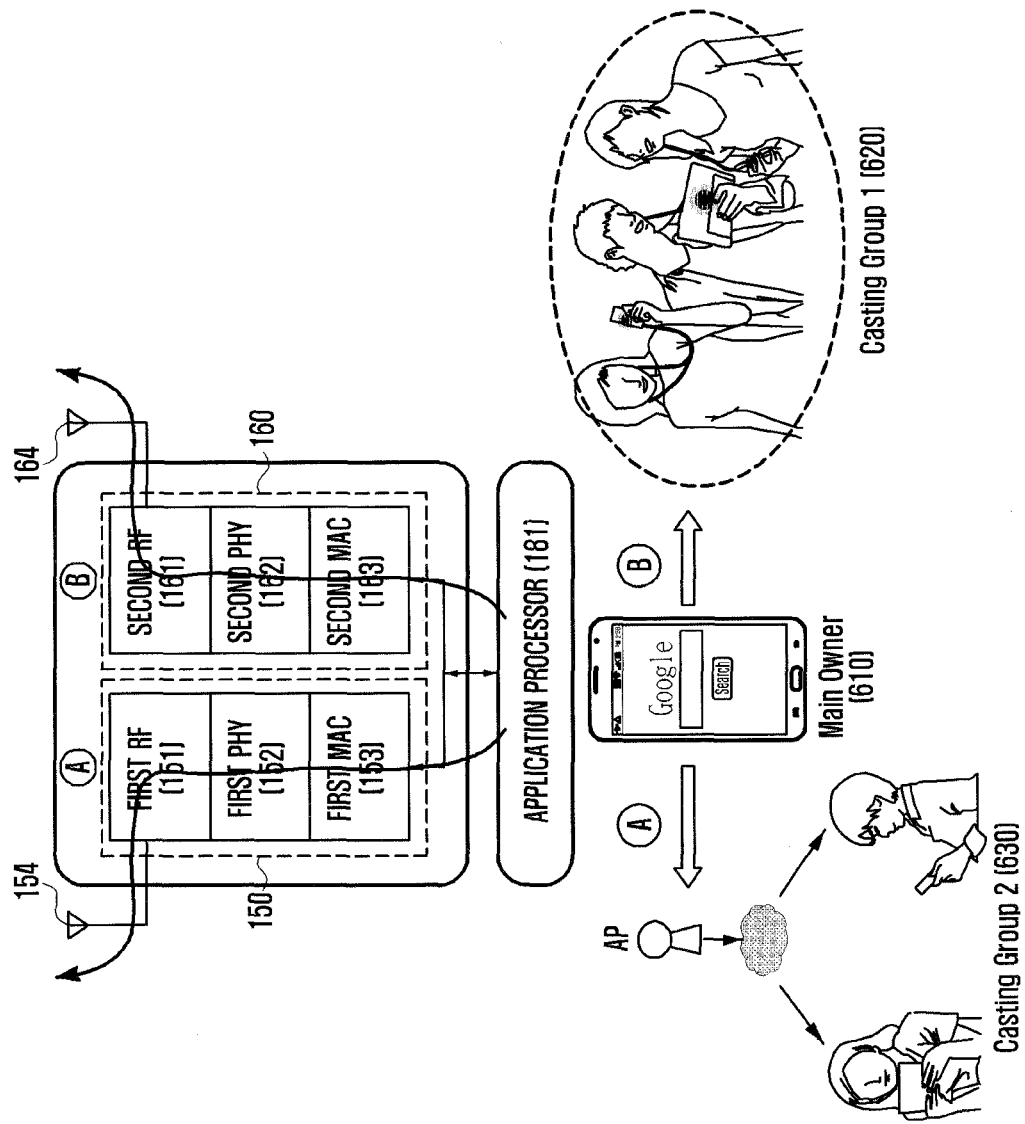
FIG. 6 illustrates a content casting service according to an exemplary embodiment of the present invention.

FIG. 6 illustrates a content casting service according to an exemplary embodiment of the present invention.

Referring to FIG. 6, a main owner 610 may include the above-described components 181, 150 and 160. The main owner 610 may connect to an access point through the first band communication module 150, and connect to a second casting group 630 through the access point. The main owner 610 may also connect to a first casting group 620 through the second band communication module 160. Here, the main owner 610 may connect directly to the first casting group 620 through, for example, Wi-Fi Direct. Thereafter, the main owner 610 may detect a user input requesting a content casting service (for example, a tap on a "Cast" button of a music player application screen).

In response to the user input, the main owner 610 may display information regarding the first casting group 620 and the second casting group 630. The information on the first casting group 620 may include identification information of external devices within the first casting group 620 (for example, phone numbers, user names, user images, device names, and the like). Here, the identification information may include information that is received by the main owner 610 from external devices of the first casting group 620 during connection establishment. The identification information may also include information pre-stored in the main owner 610 (for example, phonebook information). The information on the second casting group 630 may include identification information of external devices within the second casting group 630.

When the user selects external devices from the first casting group information and the second casting group information displayed on the screen, the main owner 610 transmits the current content (for example, a music file being played back) to the selected external devices of the second casting group 630 through the first band communication module 150 and transmits the current content to the selected external devices of the first casting group 620 through the second band communication module 160. In FIG. 6, the user may listen to music played back by the smartphone (main owner 610) and allow both nearby friends (first casting group 620) and friends at a distance (second casting group 630) to listen to music in real time. In other cases, the user may allow nearby friends and friends at a distance to view images being captured by the smartphone in real time. Also, the user may allow nearby friends and friends at a distance to hear the speech of a counterpart in a call in real time.

In the above description, the device 100 is depicted as having two physically separated communication modules to support two frequency bands. If necessary, an exemplary device of the present invention may include three or more physically separated communication modules to support three or more frequency bands.

Figure 7:
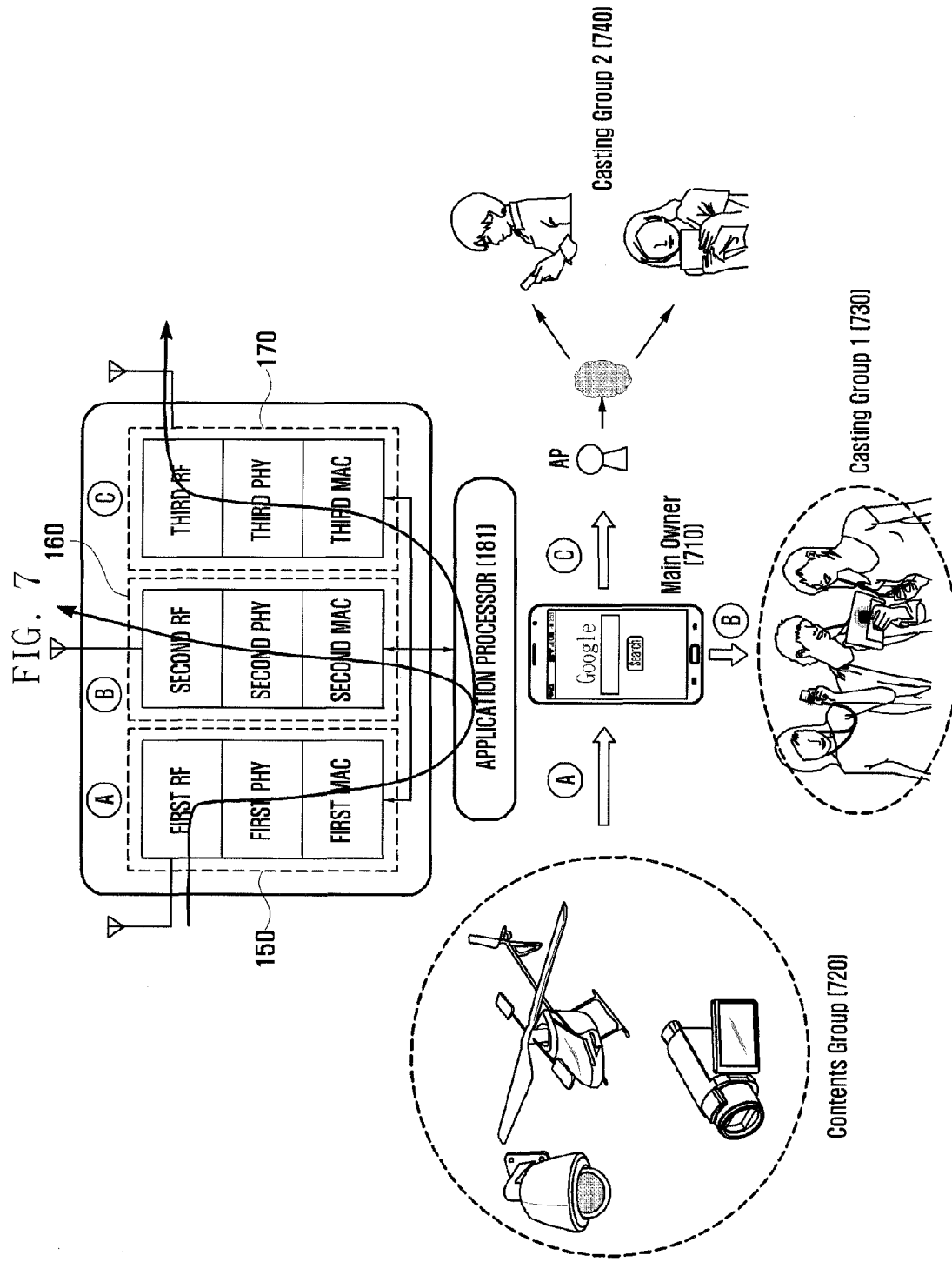
FIG. 7 illustrates a content casting service according to an exemplary embodiment of the present invention.

FIG. 7 illustrates a content casting service according to an exemplary embodiment of the present invention.

Referring to FIG. 7, a main owner 710 may include the above described components 181, 150 and 160 and may further include the third band communication module 170 supporting a third frequency band. The main owner 710 may connect to a contents group 720 through the first band communication module 150. Here, the contents group 720 is composed of accessories that are directly connectable to the main owner 710 through, for example, Wi-Fi Direct (such as a camera, a CCTV, a remote-controllable miniature car or helicopter with a camera, and the like). The main owner 710 may play back, in real-time, content received through the first band communication module 150 from the contents group 720 (for example, images captured from a miniature helicopter).

The main owner 710 may directly connect to a first casting group 730 through the second band communication module 160. The main owner 710 may connect to an access point through the third band communication module 170 and connect to a second casting group 740 through the access point. Thereafter, the main owner 710 may detect a user input requesting a content casting service (for example, a touch on a "Cast" button of a captured image screen).

In response to the user input, the main owner 710 may display information regarding the first casting group 730 and the second casting group 740. When the user selects external devices from the first casting group information and the second casting group information displayed on the screen, the main owner 710 transmits content received from the contents group 720 to the first casting group 730 through the second band communication module 160 and transmits the content to the second casting group 740 through the third band communication module 170.

Figure 8:
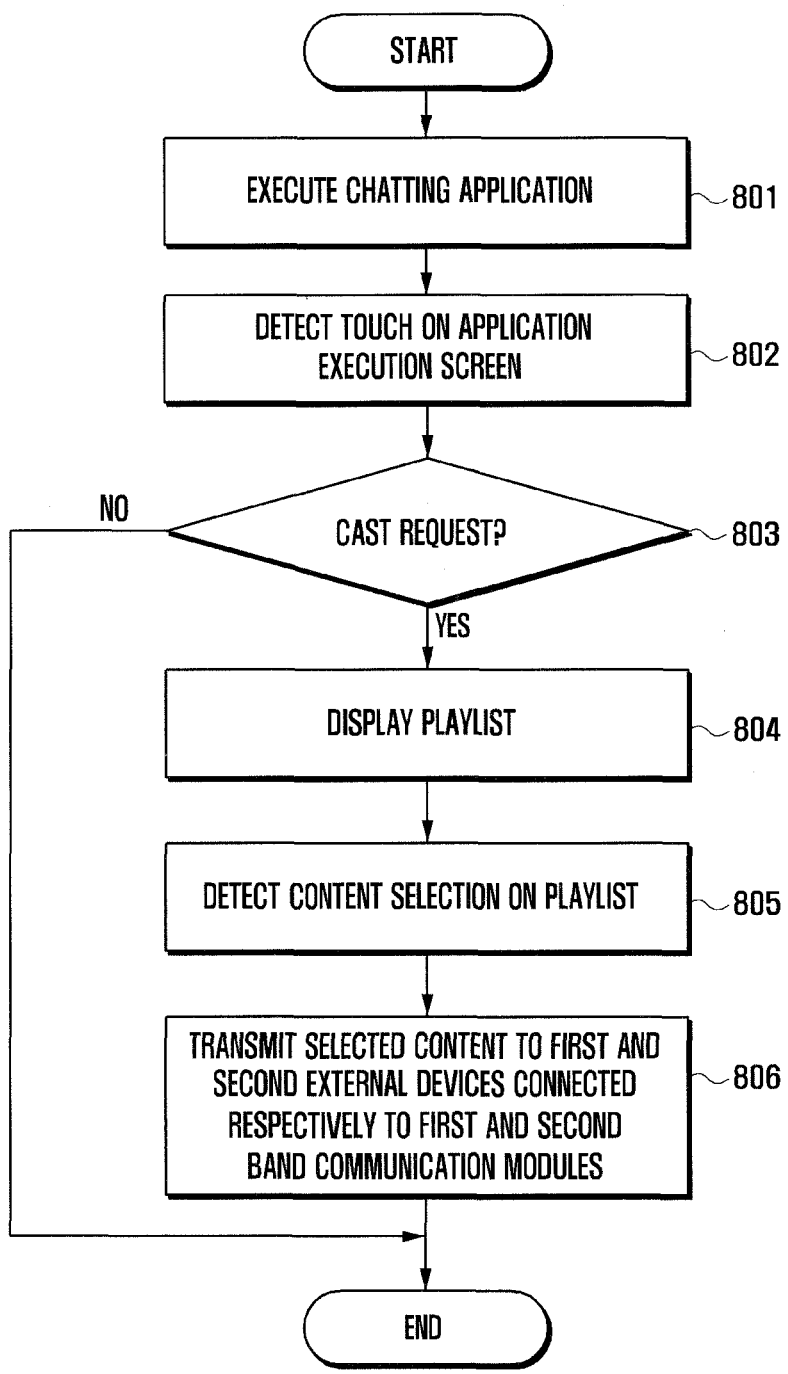
FIG. 8 is a flowchart of a method for providing a content casting service according to an exemplary embodiment of the present invention.
Figure 9:
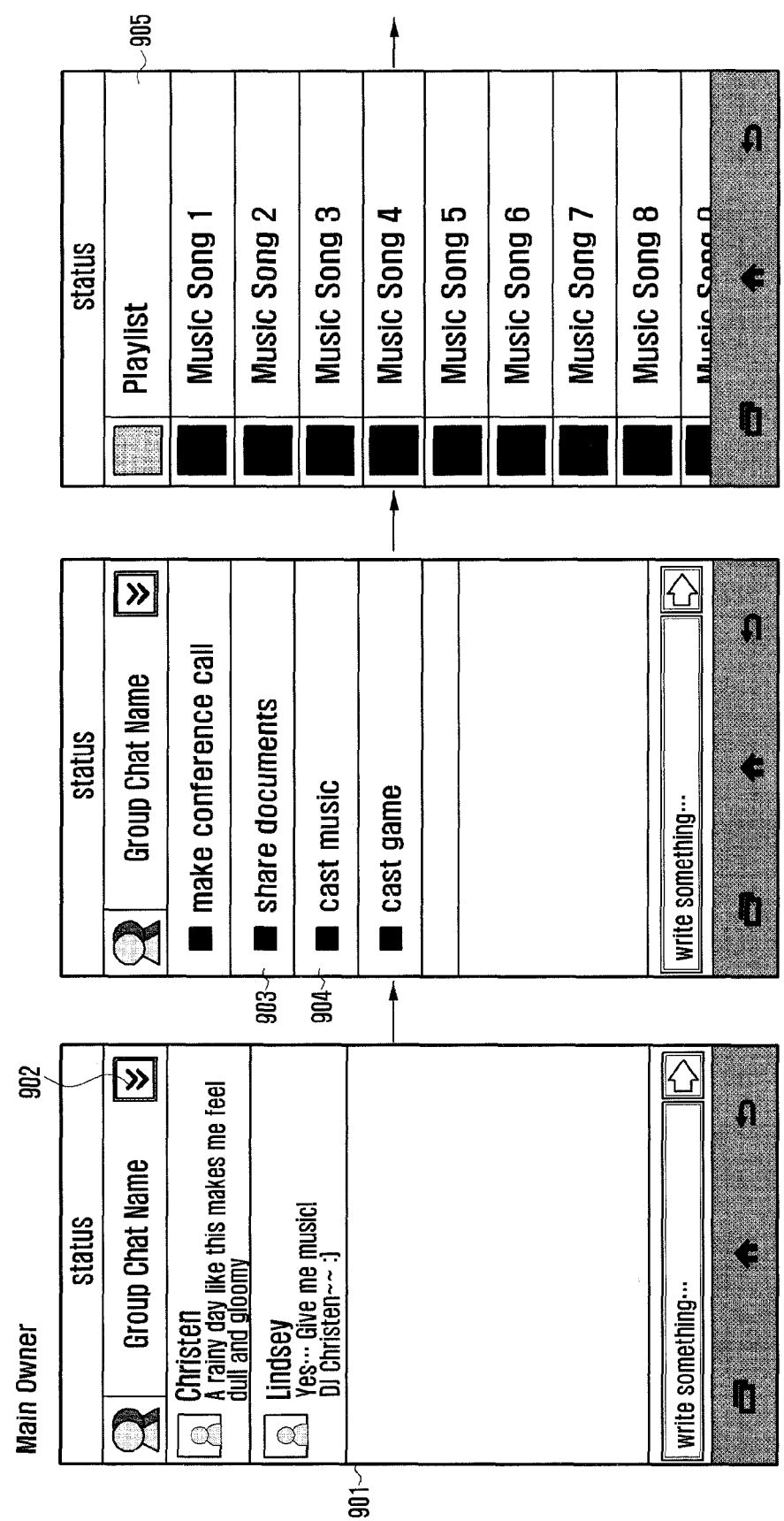
Figure 11:
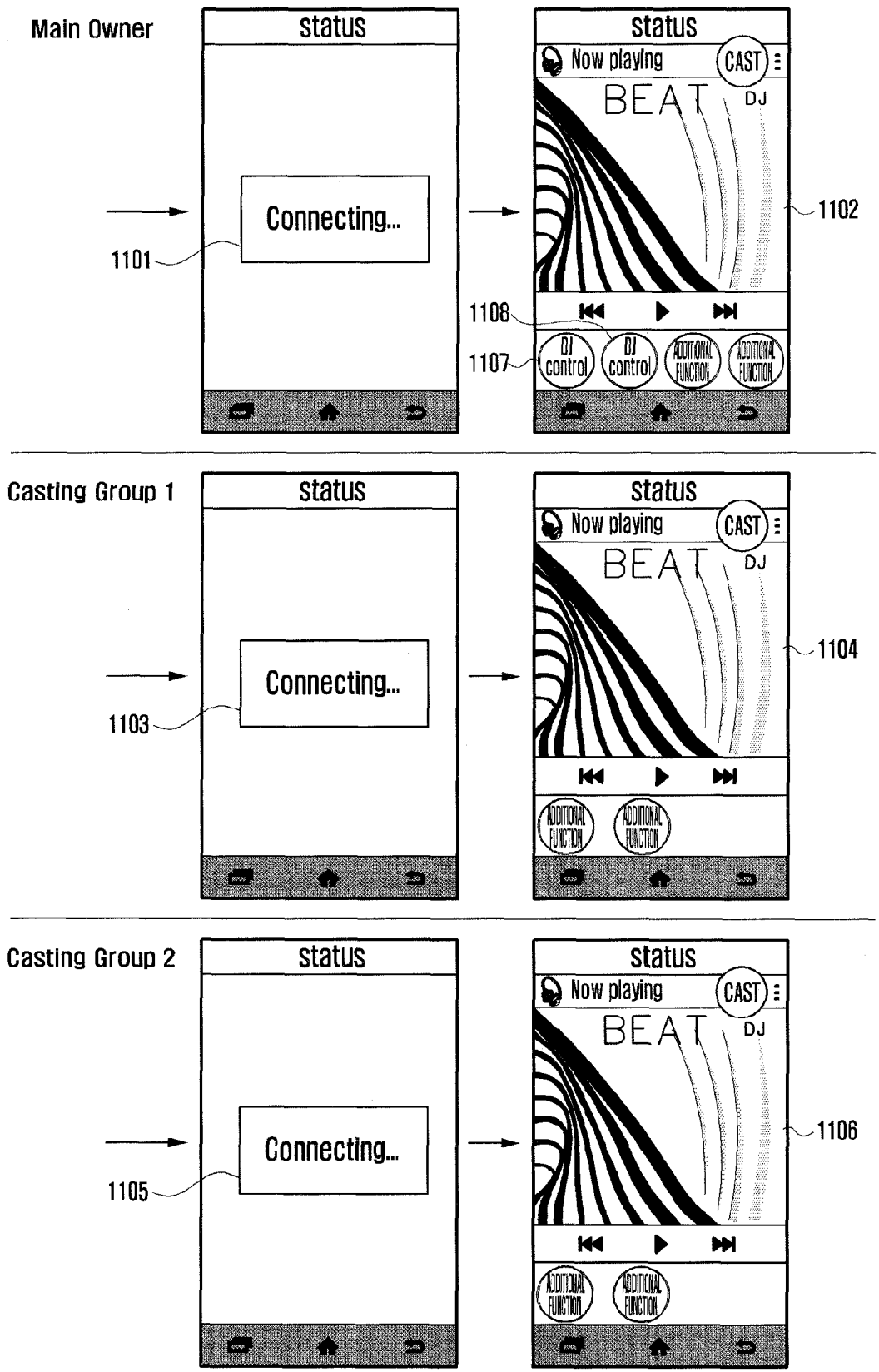

FIG. 8 is a flowchart of a method for providing a content casting service according to an exemplary embodiment of the present invention, and FIGS. 9 to 11 are screen representations depicting steps in the method of FIG. 8 according to exemplary embodiments of the present invention.

Referring to FIGS. 1 and 8 to 11, the control unit 180 of the device 100 may control the display unit 112 to display a home screen. When an icon associated with a chatting application is selected on the home screen (for example, a tap on the icon), the control unit 180 executes a chatting application associated with the selected icon in step 801. The control unit 180 may control the touchscreen 110 to display a chatting application screen as indicated by reference numeral 901 in FIG. 9.

The control unit 180 detects a touch input on the chatting application screen 901 in step 802. For example, the control unit 180 may detect selection of a first object 902 associated with an option menu on the chatting application screen 901 (e.g., a touch on the first object 902). Upon selection of the first object 902, the control unit 180 controls the touchscreen 110 to display an option menu 903.

The control unit 180 determines whether a cast request event is detected in step 803. When a cast request event is detected (for example, when a second object 904 (a cast music object) associated with content casting is selected on the option menu 903), the control unit 180 controls the touchscreen 110 to display a playlist 905 in step 804.

The control unit 180 selects music to be cast from the playlist 905 according to a user manipulation in step 805. After music selection, the control unit 180 controls the first band communication module 150 and the second band communication module 160 to transmit the selected music (content) to external devices connected respectively therewith (for example, first and second external devices) in step 806.

More specifically for step 806, when music to be cast is selected, as shown in FIG. 10, the control unit 180 controls the touchscreen 110 to display a message 1001 notifying of initiation of music casting in a chat window. The control unit 180 controls the first band communication module 150 to send a cast invite message to the first casting group. The first band communication module 150 may be directly connected to the first casting group by means of, for example, Wi-Fi Direct without an intermediate medium such as an access point under control of the control unit 180. Alternatively, the first band communication module 150 may be connected to the first casting group through an access point.

The control unit 180 controls the second band communication module 160 to send a cast invite message to the second casting group. Here, the second band communication module 160 may be directly connected to the second casting group without an access point or be connected thereto through an access point.

The control unit 180 may control an operation to send cast invite messages according to a preset priority. For example, when the first band communication module 150 is actively engaged in communication, the control unit 180 may control the second band communication module 160 to send a cast invite message to the second casting group first and then control the first band communication module 150 to send a cast invite message to the first casting group. When the first band communication module 150 and the second band communication module 160 are both available, that is, not engaged in communication, the control unit 180 may control the first band communication module 150 to send a cast invite message to the first casting group first and then control the second band communication module 160 to send a cast invite message to the second casting group.

A cast invite message 1002 is displayed in a chat window of the first casting group. A cast invite message 1003 is displayed on a chat window of the second casting group. A first external device of the first casting group may detect selection of a "Join" button in response to the cast invite message 1002. Upon selection of the "Join" button, the first external device sends a cast join message to the device 100 (main owner). When a second external device of the second casting group detects selection of a "Join" button in response to the cast invite message 1003, it sends a cast join message to the device 100.

As shown in FIG. 11, the control unit 180 controls the touchscreen 110 to display a cast wait message 1101. When cast join messages are received from the first and second casting groups, the control unit 180 controls the touchscreen 110 to display a music cast screen 1102. The control unit 180 sends the selected music data to the first casting group through the first band communication module 150, and sends the music data to the second casting group through the second band communication module 160. After sending a cast join message to the device 100, the first external device of the first casting group displays a cast wait message 1103. When music data is received from the device 100, the first external device displays a music cast screen 1104 and plays back the received music data. After sending a cast join message to the device 100, the second external device of the second casting group displays a cast wait message 1105. When music data is received from the device 100, the second external device displays a music cast screen 1106 and plays back the received music data. Among the music cast screens 1102, 1104 and 1106, the music cast screen 1102 of the device 100 may include buttons 1107 and 1108 for controlling music playback. The user may add or delete music to be cast using such buttons.

As described above in connection with FIGS. 1 and 8 to 11, the user may introduce favorite content such as music to acquaintances nearby or far away during a chat session.

Figure 12:
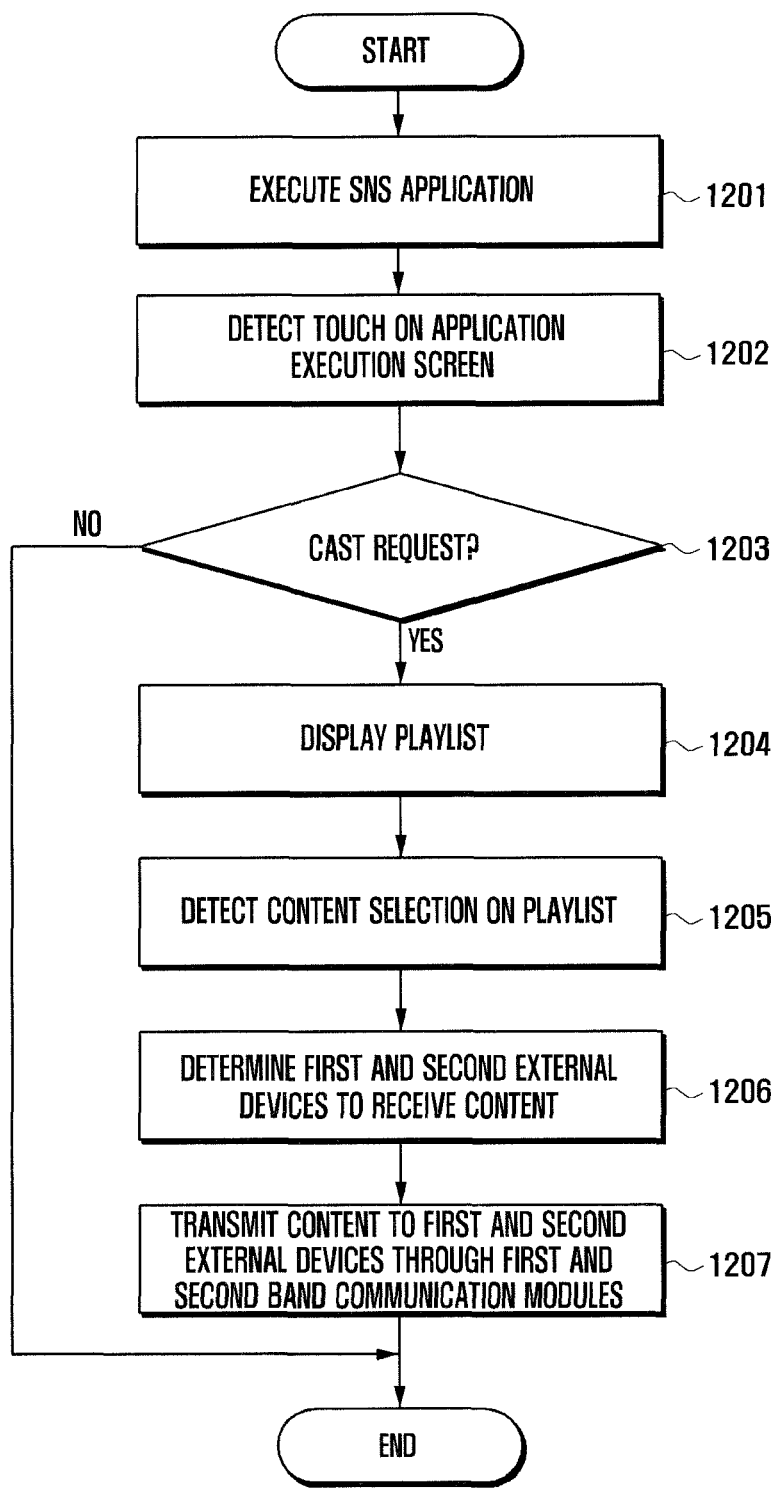
FIG. 12 is a flowchart of a method for providing a content casting service according to an exemplary embodiment of the present invention.
Figure 13:
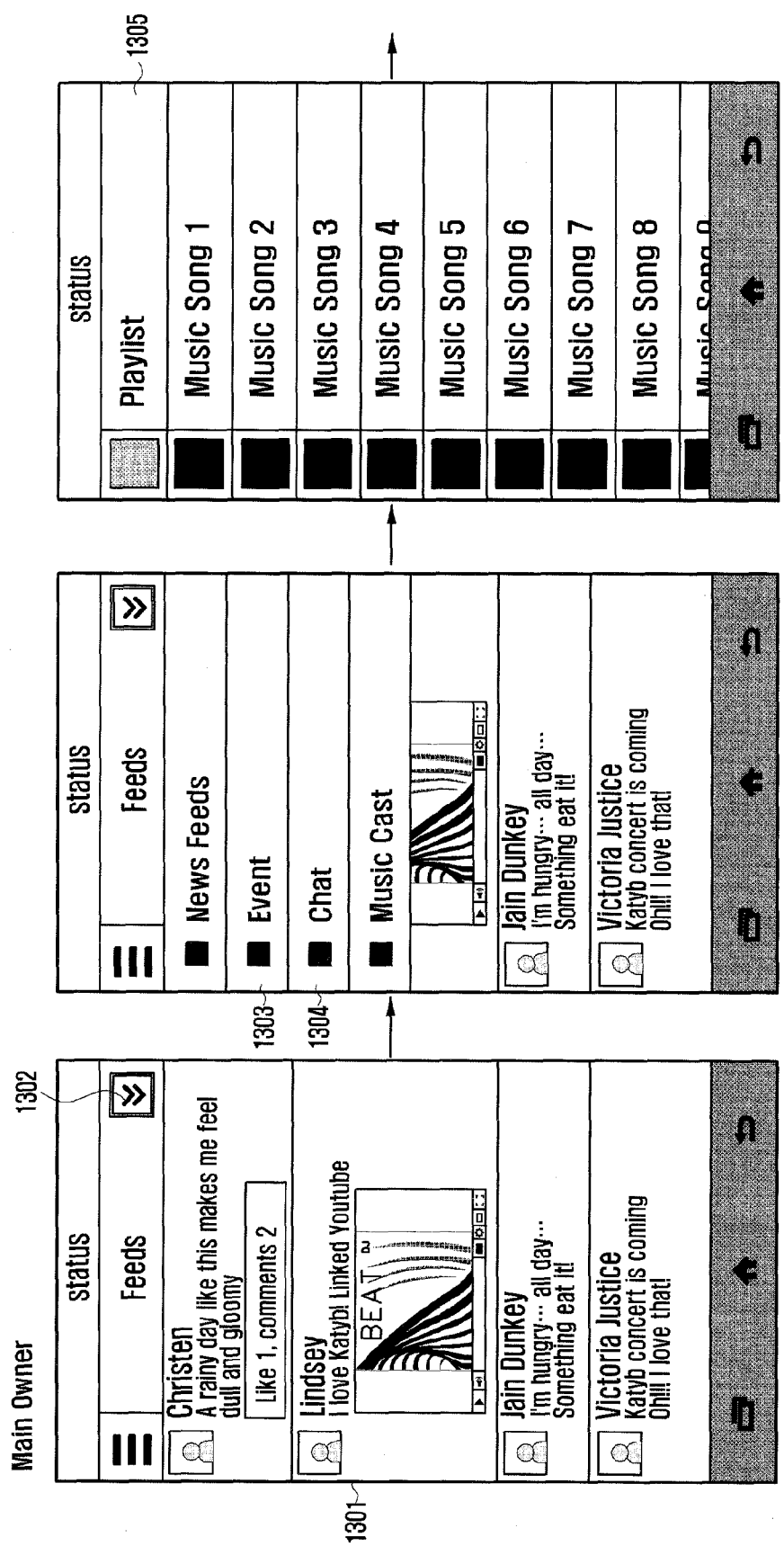

FIG. 12 is a flowchart of a method for providing a content casting service according to an exemplary embodiment of the present invention, and FIGS. 13 and 14 are screen representations depicting steps in the method of FIG. 12 according to exemplary embodiments of the present invention.

Referring to FIGS. 1 and 12 to 14, the control unit 180 of the device 100 executes an SNS application according to a user selection (for example, a tap on an icon mapped to the SNS application on the home screen) in step 1201. The control unit 180 may control the touchscreen 110 to display an SNS application screen 1301.

The control unit 180 detects a touch input on the SNS application screen 1301 in step 1202. For example, the control unit 180 may detect selection of a first object 1302 associated with an option menu on the SNS application screen 1301 (e.g. a touch on the first object 1302). Upon selection of the first object 1302, the control unit 180 controls the touchscreen 110 to display an option menu 1303.

The control unit 180 determines whether a cast request event is detected in step 1203. When a cast request event is detected (for example, when a second object 1304 (a cast music object) associated with content casting is selected on the option menu 1303), the control unit 180 controls the touchscreen 110 to display a playlist 1305 in step 1204.

The control unit 180 selects music to be cast from the playlist 1305 according to a user manipulation in step 1205. After music selection, the control unit 180 determines recipient devices to receive music (for example, first and second external devices) in step 1206.

More specifically for step 1206, when music to be cast is selected from the playlist 1305, the control unit 180 controls the touchscreen 110 to display first casting group information 1401 and second casting group information 1402. Here, the first casting group information 1401 includes identification information of external devices connected with, for example, the first band communication module 150 of the device 100. The identification information may include photographs and names of users of the external devices. The identification information may be information received from the external devices or information pre-stored in the device 100. The external devices may be directly connected to the first band communication module 150 without an access point or be connected thereto through an access point. The second casting group information 1402 may be displayed when, for example, the second band communication module 160 of the device 100 is connected to an access point. The second casting group information 1402 may be not displayed when the device 100 is not connected with an access point. The second casting group information 1402 may be obtained from contact information stored in the storage unit 130. When the user selects external devices from the displayed first casting group information 1401 and second casting group information 1402, the control unit 180 determines the selected external devices as recipient devices to receive content (music).

The control unit 180 controls the first band communication module 150 and the second band communication module 160 to transmit the selected content (music) to the recipient devices (for example, a first external device connected with the first band communication module 150 and a second external device connected with the second band communication module 160) in step 1207.

More specifically for step 1207, when an "Invite" button 1403 is selected, the control unit 180 controls the first band communication module 150 to send a cast invite message to a selected external device of the first casting group. The first band communication module 150 may be directly connected to the first casting group or be connected thereto through an access point under control of the control unit 180. In addition, the control unit 180 controls the second band communication module 160 to send a cast invite message to a selected external device of the second casting group. The second band communication module 160 may be directly connected to the second casting group or be connected thereto through an access point under control of the control unit 180. As described before, the control unit 180 may send cast invite messages according to a preset priority.

The selected external device of the first casting group displays a cast invite message 1404. The selected external device of the second casting group displays a cast invite message 1405. When a "Join" button is selected on the cast invite message 1404, the external device of the first casting group sends a cast join message to the device 100. When a "Join" button is selected on the cast invite message 1405, the external device of the second casting group sends a cast join message to the device 100. Subsequent steps are substantially the same as described in connection with FIG. 11, and a description thereof is omitted.

As described above in connection with FIGS. 1 and 12 to 14, the user may introduce favorite content such as music to acquaintances nearby or far away during an SNS session.

Figure 15:
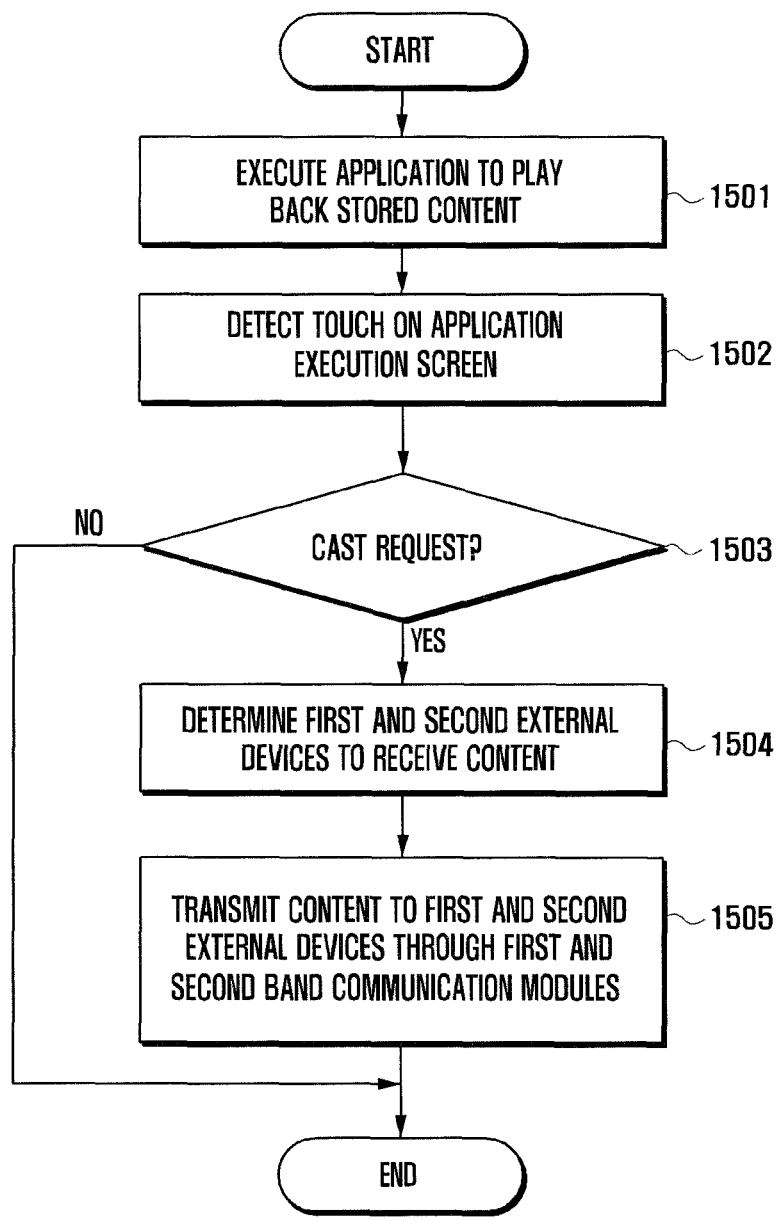
FIG. 15 is a flowchart of a method for providing a content casting service according to an exemplary embodiment of the present invention.

FIG. 15 is a flowchart of a method for providing a content casting service according to an exemplary embodiment of the present invention, and FIG. 16 illustrates representations depicting steps in the method of FIG. 15 according to exemplary embodiments of the present invention.

Referring to FIGS. 1, 15 and 16, the control unit 180 of the device 100 may control the display unit 112 to display a home screen. Here, the home screen may include icons associated with playback applications for stored content (for example, a music player and video player). When an icon is selected (for example, a tap on the icon), the control unit 180 executes a content playback application associated with the selected icon and controls the touchscreen 110 to display a content playback screen 1601 correspondingly in step 1501. When a "Play" button 1608 on the content playback screen 1601 is selected, the control unit 180 plays back content (e.g. music). Here, the content may be the last one played back by the corresponding application or one selected by the user from a playlist.

The control unit 180 detects a touch input on the content playback screen 1601 in step 1502. The control unit 180 determines whether the touch input is a cast request event in step 1503. For example, when a "Cast" button is selected on the content playback screen 1601, the control unit 180 determines recipient devices to receive content (music) (for example, first and second external devices) in step 1504. More specifically for step 1504, when the "Cast" button 1602 is selected, the control unit 180 controls the touchscreen 110 to display first casting group information 1603 and second casting group information 1604. When the user selects external devices from the displayed first casting group information 1603 and second casting group information 1604, the control unit 180 determines the selected external devices as recipient devices to receive content (music).

The control unit 180 controls the first band communication module 150 and the second band communication module 160 to transmit the content (music) to the recipient devices (for example, a first external device connected with the first band communication module 150 and a second external device connected with the second band communication module 160) in step 1505. More specifically, in step 1505, when an "Invite" button 1605 is selected, the control unit 180 controls the first band communication module 150 to send a cast invite message to a selected external device of the first casting group. In addition, the control unit 180 controls the second band communication module 160 to send a cast invite message to a selected external device of the second casting group. As described before, the control unit 180 may send cast invite messages according to a preset priority. Accordingly, the selected external device of the first casting group displays a cast invite message 1606. The selected external device of the second casting group displays a cast invite message 1607. When a "Join" button is selected on the cast invite message 1606, the external device of the first casting group sends a cast join message to the device 100. When a "Join" button is selected on the cast invite message 1607, the external device of the second casting group sends a cast join message to the device 100. Subsequent steps are substantially the same as described in connection with FIG. 11, and a description thereof is omitted.

As described above in connection with FIGS. 1, 15 and 16, the user listening to music using a player application on the smartphone may introduce the music to acquaintances nearby or far away.

Figure 17:
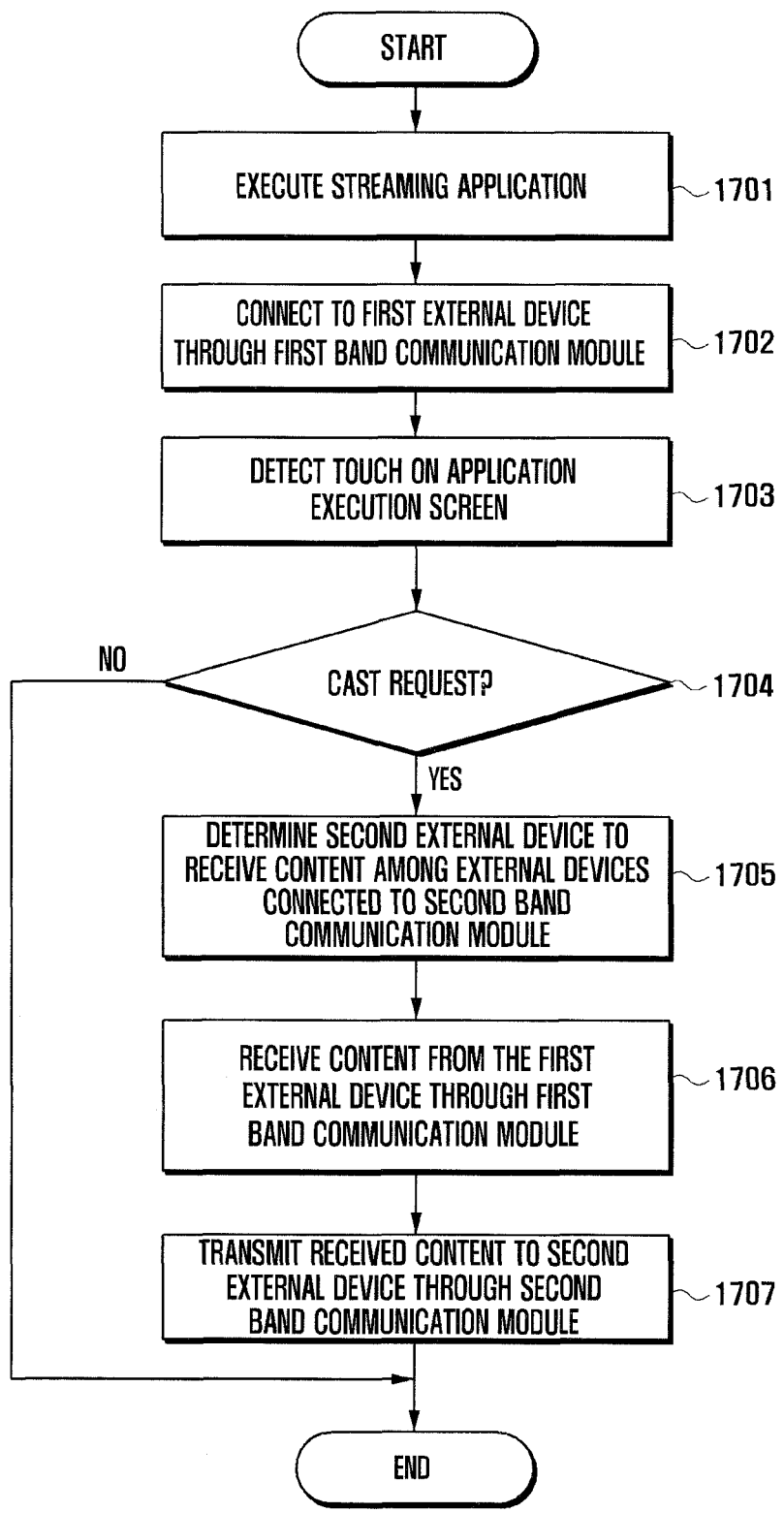
FIG. 17 is a flowchart of a method for providing a content casting service according to an exemplary embodiment of the present invention.
Figure 18:
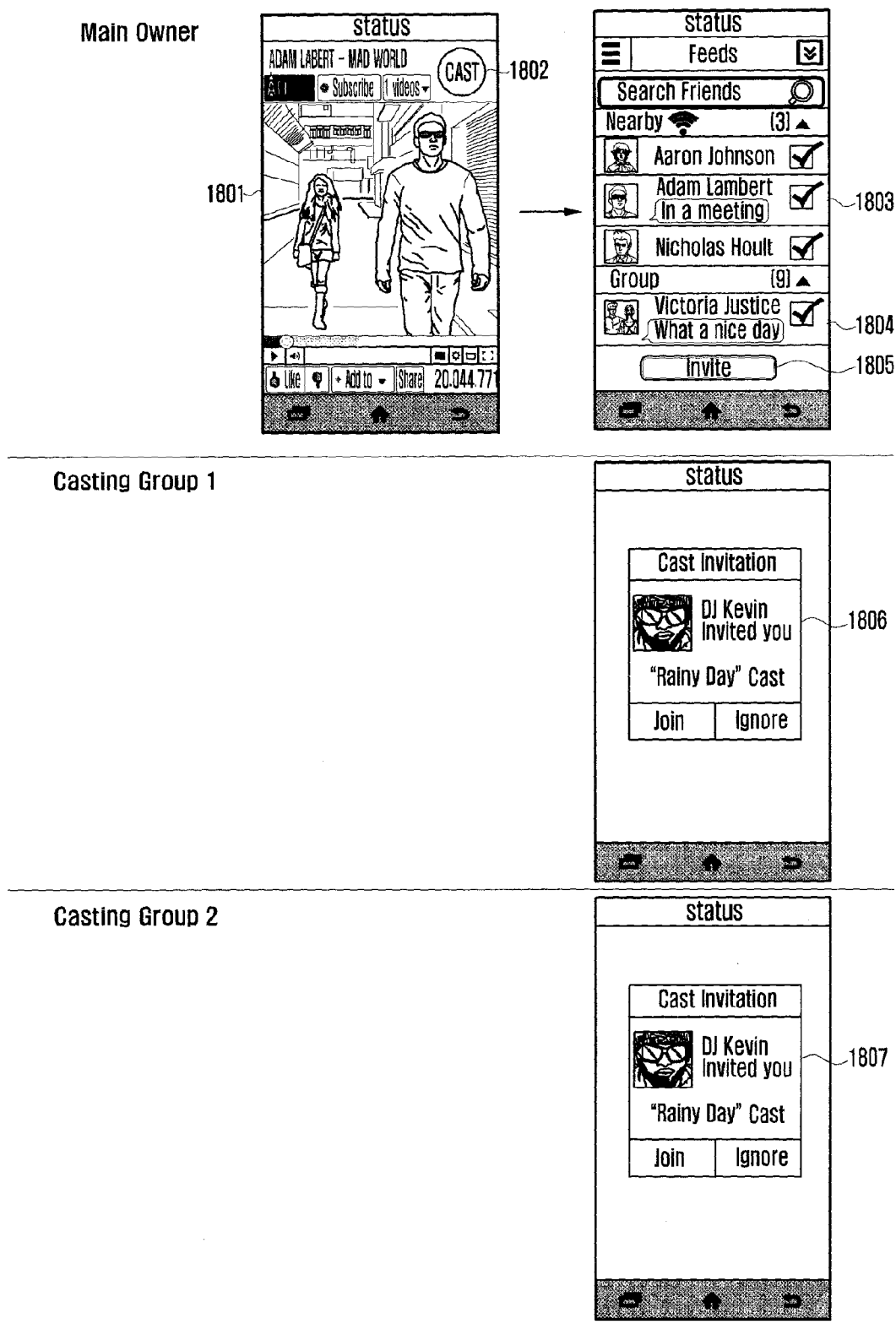
FIG. 18 illustrates screen representations depicting steps in the method of FIG. 17 according to exemplary embodiments of the present invention.

FIG. 17 is a flowchart of a method for providing a content casting service according to an exemplary embodiment of the present invention, and FIG. 18 illustrates screen representations depicting steps in the method of FIG. 17 according to exemplary embodiments of the present invention.

Referring to FIGS. 1, 17 and 18, the control unit 180 of the device 100 may control the display unit 112 to display a home screen. Here, the home screen may include icons associated with streaming applications such as a music player, a video player, a mobile browser, and the like. When an icon is selected (for example, the icon is tapped), the control unit 180 executes a streaming application associated with the selected icon and controls the touchscreen 110 to display a streaming application screen 1801 correspondingly in step 1701.

The control unit 180 controls the first band communication module 150 to connect to a first external device providing a streaming service (for example, a YouTube server) in step 1702. Here, the first band communication module 150 may connect to the first external device through an access point. The control unit 180 may control the first band communication module 150 to download content (e.g. moving image or music) from the first external device and control the touchscreen 110 to play back the downloaded content in real time.

The control unit 180 detects a touch input on the streaming application screen 1801 in step 1703. The control unit 180 determines whether the touch input is a cast request event in step 1704. For example, when a "Cast" button 1802 is selected on the streaming application screen 1801, the control unit 180 determines recipient devices to receive content (for example, second external device) among external devices connected with the second band communication module 160 in step 1705.

More specifically for step 1705, under control of the control unit 180, the second band communication module 160 may be directly connected with one or more nearby external devices through, for example, Wi-Fi Direct without an intermediate medium such as an access point. The control unit 180 controls the touchscreen 110 to display first casting group information 1803 regarding external devices connected to the second band communication module 160. The control unit 180 may detect user selection on the first casting group information 1803. The control unit 180 may control the touchscreen 110 to display second casting group information 1804. Here, the second casting group information 1804 may be displayed when the third band communication module 170 is connected to an access point. The second casting group information 1804 may be not displayed when the third band communication module 170 is not connected to an access point. The second casting group information 1804 may be, for example, contact information stored in the storage unit 130. The control unit 180 may detect a user selection on the second casting group information 1804. When an "Invite" button 1805 is selected, the control unit 180 controls the second band communication module 160 to send a cast invite message to a selected external device of the first casting group. In addition, the control unit 180 controls the third band communication module 170 to send a cast invite message to a selected external device of the second casting group. Accordingly, the selected external device of the first casting group displays a cast invite message 1806. The selected external device of the second casting group displays a cast invite message 1807. When a "Join" button is selected on the cast invite message 1806, the external device of the first casting group sends a cast join message to the device 100. When a "Join" button is selected on the cast invite message 1807, the external device of the second casting group sends a cast join message to the device 100. The control unit 180 determines the external device of the first casting group having sent a cast join message (a second external device) as a recipient device to receive content. The control unit 180 determines the external device of the second casting group having sent a cast join message (a third external device) as a recipient device to receive content.

After determining recipient devices, the control unit 180 controls the first band communication module 150 to receive streaming content (e.g. moving images or music) from the first external device in step 1706. The control unit 180 plays back the received streaming content, and transmits the streaming content to the second external device through the second band communication module 160 in step 1707. The control unit 180 may also transmit the received streaming content to the third external device through the third band communication module 170.

As described above in connection with FIGS. 1, 17 and 18, the user viewing, for example, a YouTube video using a moving image player on the smartphone may introduce the video to acquaintances nearby or far away.

FIG. 19 illustrates screen representations of a method for providing a content casting service according to exemplary embodiments of the present invention.

Referring to FIGS. 1 and 19, the control unit 180 of the device 100 may control the touchscreen 110 to display a camera application screen 1901. For example, the control unit 180 may activate a camera module and display images captured by the camera module on the touchscreen 110. For another example, the control unit 180 may control the first band communication module 150 to connect to an accessory (e.g. a miniature helicopter that has a Wi-Fi Direct capability and a camera module and that is controlled remotely by the control unit 180) and receive captured images from the accessory, and control the touchscreen 110 to display the received images.

When a "Cast" button 1902 is selected on the camera application screen 1901, the control unit 180 controls the touchscreen 110 to display first casting group information 1903 and second casting group information 1904.

The user may select external devices from the displayed first casting group information 1903 and second casting group information 1904. When an "Invite" button 1905 is selected, the control unit 180 controls the second band communication module 160 to send a cast invite message to a selected external device of the first casting group. In addition, the control unit 180 controls the third band communication module 170 to send a cast invite message to a selected external device of the second casting group. Accordingly, the selected external device of the first casting group displays a cast invite message 1906. The selected external device of the second casting group displays a cast invite message 1907. Subsequent steps are substantially the same as described in connection with FIG. 11, and a description thereof is omitted.

As described above in connection with FIGS. 1 and 19, the user viewing moving images captured by a camera module installed in the smartphone or an external accessory may introduce the moving images to acquaintances nearby or far away.

Figure 20:
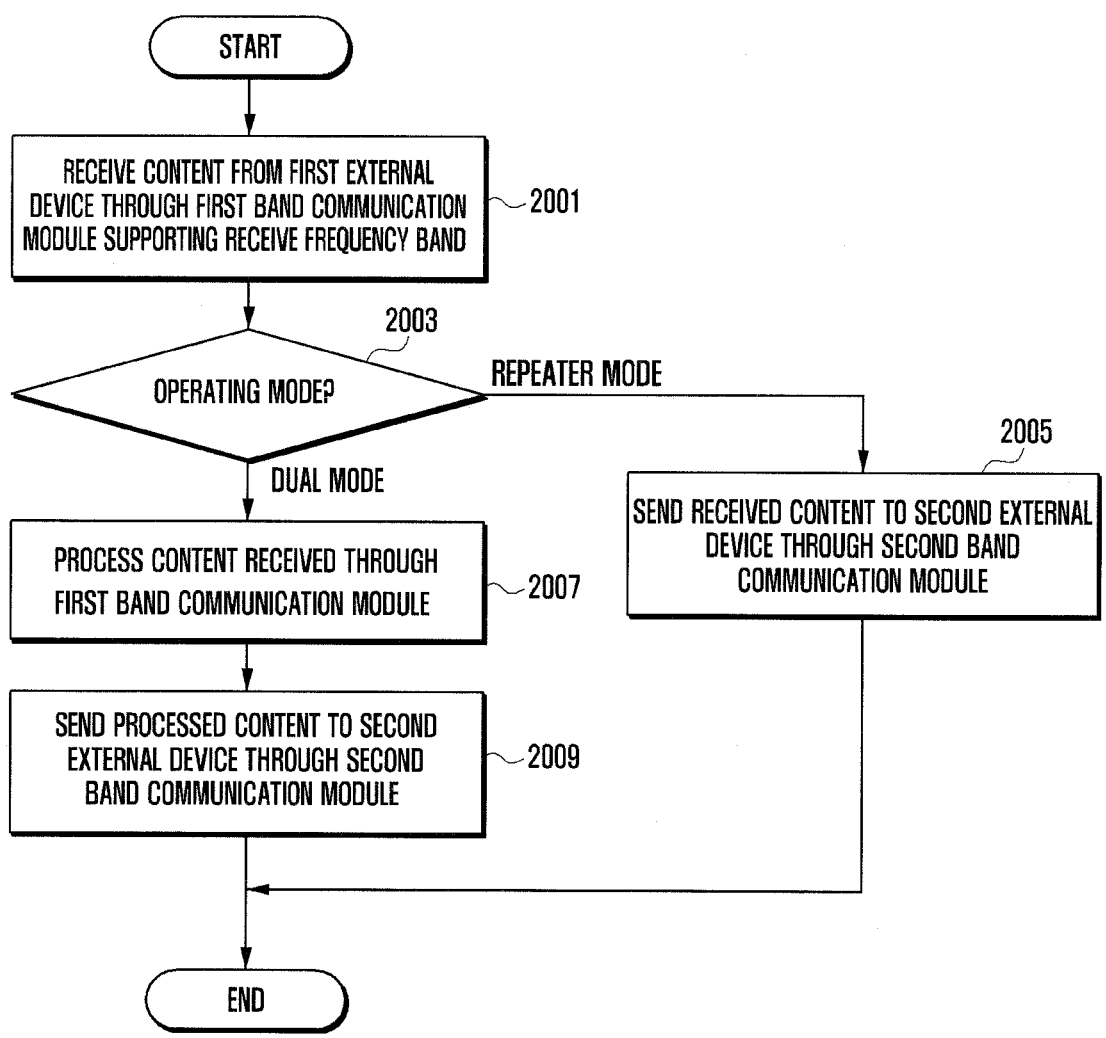
FIG. 20 is a flowchart of a procedure to determine whether to operate in a dual mode or repeater mode according to an exemplary embodiment of the present invention.

FIG. 20 is a flowchart of a procedure to determine whether to operate in a dual mode or repeater mode according to an exemplary embodiment of the present invention.

Referring to FIGS. 1 and 20, the control unit 180 of the device 100 controls the first band communication module 150 supporting a receive frequency band to receive content from a first external device (such as a YouTube server) in step 2001. The control unit 180 determines an operating mode for a content casting service in step 2003. The operating mode may be determined in consideration of the type of the received content. For example, when the received content is a document file or a compressed file, the operating mode may be set to a repeater mode. When the received content is a moving image, the operating mode may be set to a dual mode.

When the operating mode is determined to be a repeater mode, the control unit 180 controls the second band communication module 160 to send the received content to a second external device in step 2005. When the operating mode is determined to be a dual mode, the control unit 180 processes the content received through the first band communication module 150 (for example, resolution adjustment) in step 2007, and controls the second band communication module 160 to send the processed content to a second external device in step 2009.

In an exemplary feature of the present invention, a method and device that support content casting services are provided. Content data may be received from a first external device through a receive frequency band and be transmitted to a second external device through a transmit frequency band at the same time. Content can be simultaneously transmitted to external devices through multiple transmit frequency bands.

The exemplary methods of the present invention may be implemented as computer programs and may be stored in various computer readable storage media. The computer readable storage media may store program instructions, data files, data structures and combinations thereof. The program instructions may include instructions developed specifically for the present invention and existing general-purpose instructions. The computer readable storage media may include magnetic media such as a hard disk and floppy disk, optical media such as a CD-ROM and DVD, magneto-optical media such as a floptical disk, and memory devices such as a ROM and RAM. The program instructions may include machine codes produced by compilers and high-level language codes executable through interpreters. Each hardware device may be replaced with one or more software modules to perform operations according to the present invention, and vice versa.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing a content casting service in a device having a first band communication module for communicating with external devices over a first frequency band and a second band communication module for communicating with external devices over a second frequency band, the method comprising:

detecting occurrence of a cast request event, indicating content delivery;
in response to the cast request event:
selecting a first external device possessing the indicated content;
displaying a casting group information;
selecting a second external device corresponding to a visual object selected by a user in the casting group information;
receiving the content from the selected first external device through the first band communication module; and
transmitting the received content to a second external device through the second band communication module.

2. The method of claim 1, wherein the detecting of the occurrence of the cast request event comprises detecting a selection of an object associated with a content casting function on an application execution screen displayed on a touchscreen.

3. The method of claim 2, wherein the application execution screen comprises an execution screen of at least one of a chatting application, a social networking service (SNS) application, a music player, a moving-image player, a camera application, and a remote control application capable of remotely controlling the first external device.

4. The method of claim 1, wherein the transmitting of the received content comprises transmitting, when the second band communication module is connected to the second external device via an access point or is directly connected thereto without an access point, the received content to the second external device in a streaming fashion.

5. The method of claim 1, wherein the transmitting of the received content comprises playing back, when the second band communication module is connected to the second external device via an access point or is directly connected thereto without an access point, the received content and transmitting the received content to the second external device.

6. The method of claim 1, further comprising:
selecting at least one of identification information items displayed on a touchscreen,
wherein the transmitting of the received content comprises transmitting the received content to a second external device indicated by the selected identification information item.

7. The method of claim 6, wherein the displayed identification information items comprises identification information of a second external device placed near to the device.

8. The method of claim 6, further comprising:
transmitting a cast invite message to a second external device indicated by the selected identification information item,
wherein the received content is sent to the second external device having sent a cast join message as a reply to the cast invite message.

9. The method of claim 1, wherein the receiving of the content comprises receiving the content in a streaming fashion from the first external device connected to the first band communication module through an access point.

10. A method of providing a content casting service in a device having a first band communication module for communicating with external devices over a first frequency band and a second band communication module for communicating with external devices over a second frequency band, the method comprising:

detecting occurrence of a cast request event indicating content;
selecting, upon detection of the cast request event, one of contents stored in a storage unit;
selecting a first external device and a second external device;
first transmitting the selected content to the first external device through the first band communication module; and
second transmitting the selected content to the second external device through the second band communication module,
wherein the first transmitting and the second transmitting are performed at the same time.

11. The method of claim 10, wherein the detecting of the occurrence of the cast request event comprises selecting an object associated with a content casting function on an application execution screen displayed on a touchscreen.

12. The method of claim 11, wherein the application execution screen comprises an execution screen of at least one of a chatting application, a social networking service (SNS) application, a music player, a moving-image player, a camera application, and a remote control application capable of remotely controlling an external device.

13. The method of claim 10, further comprising:
transmitting a cast invite message to the first external device through the first band communication module; and
transmitting a cast invite message to the second external device through the second band communication module,
wherein the cast invite messages are sent in order of preset priority.

14. The method of claim 10, wherein the selecting of the first external device and the second external device further comprises selecting the first external device and the second external device from a displayed list of devices of at least one casting group.

15. A device capable of providing a content casting service, the device comprising:
a touchscreen configured to provide a user interface for user interactions;
a first band communication module configured to communicate with a first external device over a first frequency band;
a second band communication module configured to communicate with a second external device over a second frequency band, the first band communication module and second band communication module are integrated into one chip; and
a control unit configured to control the touchscreen, the first band communication module and the second band communication module,
wherein the control unit is further configured to:
detect occurrence of a cast request event indicating content delivery, and
in response to the cast request event, to:
select the first external device possessing the indicated content,
display a casting group information,
select a second external device corresponding to a visual object selected by a user in the casting group information,
receive the content from the first external device through the first band communication module, and transmit the received content to the second external device through the second band communication module.

16. The device of claim 15, wherein the control unit is further configured to:
control the touchscreen to display an application execution screen,
detect selection of an object associated with a content casting function on the application execution screen, and
control transmission of the received content upon selection of the object.

17. The device of claim 15, wherein, when the second band communication module is connected to the second external device via an access point or is directly connected thereto without an access point, the control unit is further configured to transmit the received content to the second external device in a streaming fashion.

18. The device of claim 15, wherein the control unit is further configured to:
detect selection of at least one of identification information items displayed on the touchscreen, and
control the second band communication module to transmit the received content to a second external device indicated by the selected identification information item.

19. A device capable of providing a content casting service, the device comprising:
a touchscreen configured to provide a user interface for user interaction;
a first band communication module configured to communicate with a first external device over a first frequency band;
a second band communication module configured to communicate with a second external device over a second frequency band, the first band communication module and second band communication module are integrated into one chip; and
a control unit configured to control the touchscreen, the first band communication module and the second band communication module,
wherein the control unit is further configured to:
detect occurrence of a cast request event indicating content delivery,
select, upon detection of the cast request event, one of content stored in a storage unit,
select a first external device and second external device,
first transmit the selected content to the first external device through the first band communication module, and
second transmit the selected content to the second external device through the second band communication module, and
wherein the first transmitting and the second transmitting are performed at the same time.

20. The device of claim 19, wherein the control unit is further configured to:
control the touchscreen to display an application execution screen,
detect selection of an object associated with a content casting function on the application execution screen, and
control transmission of the selected content upon selection of the object.

21. The device of claim 19, wherein the control unit is further configured to:
control the first band communication module to transmit a cast invite message to the first external device and controlling the second band communication module to transmit a cast invite message to the second external device, and
control an operation to transmit the cast invite messages in order of a preset priority.

22. A device capable of providing a content casting service, the device comprising:
a touchscreen configured to provide a user interface for user interaction;
a first band communication module configured to communicate with a first external device over a first frequency band;
a second band communication module configured to communicate with a second external device over a second frequency band, the first band communication module and second band communication module are integrated into one chip; and
a control unit configured to control the touchscreen, the first band communication module and the second band communication module,
wherein the control unit is further configured to:
detect occurrence of a cast request event indicating image delivery,
in response to the cast request event to:
display casting group information;
select an external device corresponding to a visual object selected by a user in the casing group information,
receive captured images from the first external device through the first band communication module, and
transmit the received captured images to the selected external device through the second band communication module.

23. A non-transitory storage medium storing program instructions executable by a device having a first band communication module for communicating with external devices over a first frequency band and a second band communication module for communicating with external devices over a second frequency band, the program instructions executed by a processor to perform a method of providing a content casting service, the method comprising:
detecting occurrence of a cast request event indicating content delivery;
in response to the cast request event:
selecting a first external device possessing the indicated content;
displaying a casting group information;
selecting a second external device corresponding to a visual object selected by a user in the casting group information;
receiving the content from the first external device through the first band communication module; and
transmitting the received content to the selected external device through the second band communication module.

24. A method of providing a content casting service in a device having a first band communication module for communicating with external devices over a first frequency band and a second band communication module for communicating with external devices over a second frequency band, the method comprising:
detecting occurrence of a cast request event indicating image;
in response to the cast request event:

displaying casting group information;
selecting an external device corresponding to a visual object selected by a user in the casing group information;
receiving captured images from an external device through the first band communication module; and
transmitting the received captured images to the selected external device through the second band communication module.

\* \* \* \* \*